United States Patent
Oberdalhoff et al.

(10) Patent No.: US 12,064,910 B2
(45) Date of Patent: Aug. 20, 2024

(54) SYSTEM FOR THE IMPROVED INTRODUCTION OF A SEPARATING DEVICE AND BLOWN FILM LINE, AS WELL AS A METHOD FOR THE PRODUCTION AND SUPPLY OF AT LEAST TWO PLASTIC FILM WEBS IN A BLOWN FILM LINE

(71) Applicant: Windmöller & Hölscher KG, Lengerich (DE)

(72) Inventors: Tim Oberdalhoff, Lienen (DE); Thomas Sehlleier, Coesfeld-Lette (DE); Sebastian Martinek, Neuenkirchen-Vörden (DE); Tim Kirchhoff, Münster (DE)

(73) Assignee: Windmöller & Hölscher KG, Lengerich (DE)

( * ) Notice: Subject to any disclaimer, the term of this patent is extended or adjusted under 35 U.S.C. 154(b) by 134 days.

(21) Appl. No.: 17/599,824

(22) PCT Filed: Mar. 27, 2020

(86) PCT No.: PCT/EP2020/058852
§ 371 (c)(1),
(2) Date: Sep. 29, 2021

(87) PCT Pub. No.: WO2020/201155
PCT Pub. Date: Oct. 8, 2020

(65) Prior Publication Data
US 2022/0193974 A1 Jun. 23, 2022

(30) Foreign Application Priority Data
Mar. 29, 2019 (DE) .................. 10 2019 108 344.3
Oct. 11, 2019 (DE) .................. 10 2019 127 454.0

(51) Int. Cl.
B29C 48/00 (2019.01)
B26D 1/02 (2006.01)
(Continued)

(52) U.S. Cl.
CPC .......... B29C 48/0022 (2019.02); B26D 1/025 (2013.01); B29C 48/0017 (2019.02);
(Continued)

(58) Field of Classification Search
CPC ..... B29C 48/10; B29C 48/0022; B29C 48/28; B29C 2793/0036; B29C 2793/0054;
(Continued)

(56) References Cited

U.S. PATENT DOCUMENTS 2,757,495 A 8/1956 Reichel
3,009,200 A 11/1961 Voigt
(Continued)

FOREIGN PATENT DOCUMENTS

DE 202004013959 U1 1/2006
DE 202004017249 U1 3/2006
(Continued)

OTHER PUBLICATIONS

Office Action for German Application No. 10 2019 127 454.0 mailed Jan. 22, 2021, with its English translation, 8 pages.
(Continued)

*Primary Examiner* — Jeffrey M Wollschlager
(74) *Attorney, Agent, or Firm* — Peter W. Schroen; Bret E. Field; Bozicevic, Field & Francis LLP

(57) ABSTRACT

The invention relates to a system (10) for improved introduction of a separating device (40) into a flattened film tube (2) of a blown film line (1), with a cutting device (20) for severing only a first tube side (2.1) of the film tube (2), in particular the film tube (2) which has not yet been flattened.
(Continued)

Figure 1:
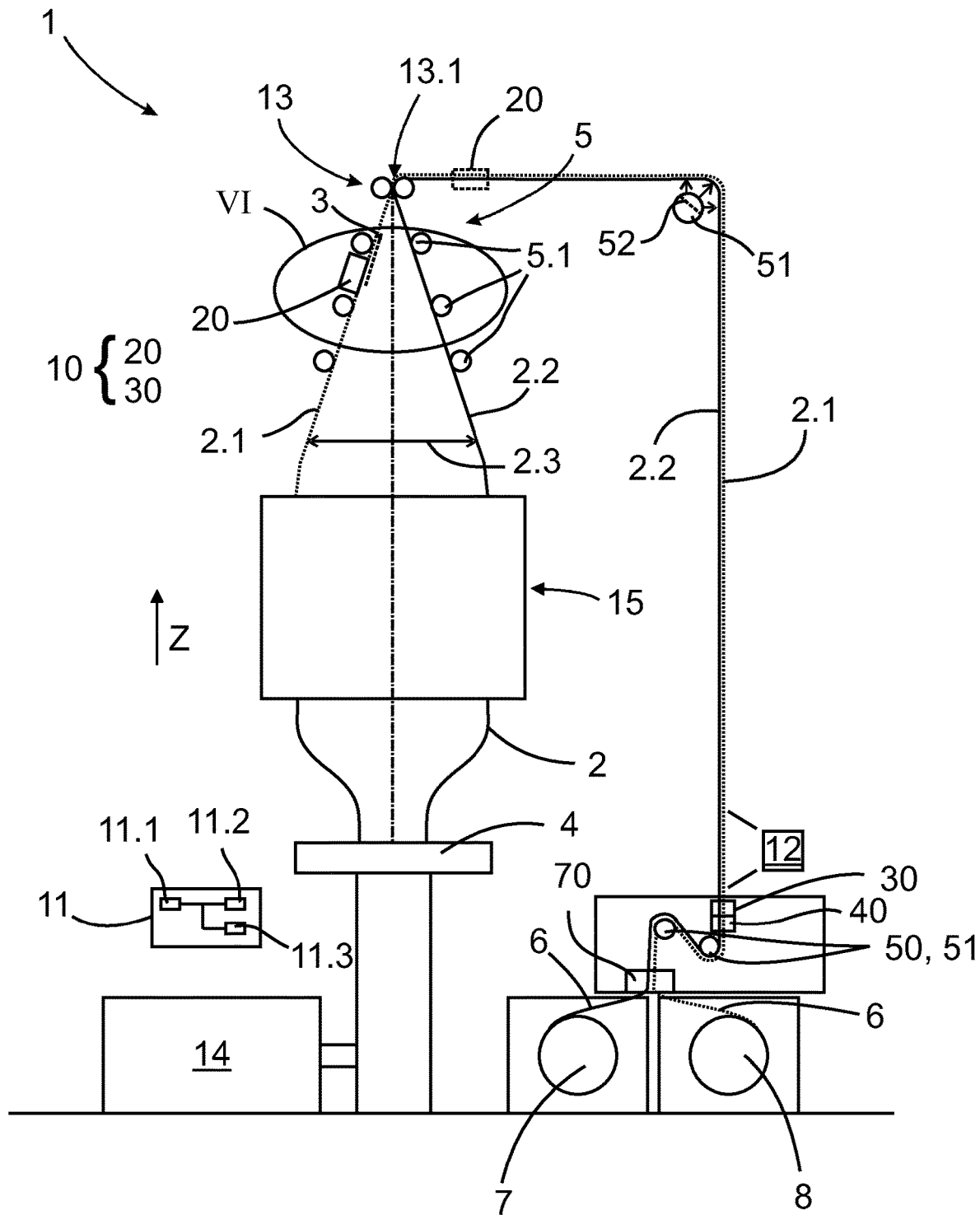

Furthermore, the invention relates to a blown film line (1), as well as a method (100) for producing and providing at least two film webs (6).

54 Claims, 31 Drawing Sheets

(51) Int. Cl.
*B29C 48/10* (2019.01)
*B29C 48/25* (2019.01)
*B29C 48/28* (2019.01)
*B29C 48/355* (2019.01)
*B29C 48/92* (2019.01)
*B29L 23/00* (2006.01)

(52) U.S. Cl.
CPC ...... *B29C 48/0018* (2019.02); *B29C 48/0019* (2019.02); *B29C 48/10* (2019.02); *B29C 48/2528* (2019.02); *B29C 48/28* (2019.02); *B29C 48/355* (2019.02); *B29C 48/92* (2019.02); *B29C 2793/0036* (2013.01); *B29C 2793/0054* (2013.01); *B29C 2793/0063* (2013.01); *B29C 2948/92295* (2019.02); *B29C 2948/92438* (2019.02); *B29C 2948/92447* (2019.02); *B29L 2023/001* (2013.01)

(58) Field of Classification Search
CPC ........ B29C 2793/0063; B29C 48/0018; B29C 48/92; B26D 1/035; B26D 1/025; B26D 3/001; B26D 5/04; B26D 5/32; B26D 5/34; B26D 11/00; B65H 35/0086; B65H 18/08; B65H 35/02; B65H 43/08; B65H 2301/41487; B65H 2511/12; B65H 2701/11214; B65H 2701/1752; B26F 3/004; B23K 26/38
See application file for complete search history.

(56) References Cited

U.S. PATENT DOCUMENTS

| | | | | |
|---|---|---|---|---|
| 3,157,560 | A | * | 11/1964 | Livingston ............ B29C 43/305 522/89 |
| 3,231,651 | A | | 1/1966 | Cheney |
| 3,574,806 | A | * | 4/1971 | Potter ..................... B29C 48/10 425/72.1 |
| 3,789,713 | A | | 2/1974 | Peters |
| 3,909,176 | A | * | 9/1975 | Madonini ............. B29D 29/00 425/325 |
| 4,242,295 | A | * | 12/1980 | Urquhart ................ B26D 3/001 156/244.18 |
| 4,484,971 | A | | 11/1984 | Wang |
| 5,789,042 | A | * | 8/1998 | Jester ...................... B29D 7/01 264/177.17 |
| 6,068,462 | A | * | 5/2000 | Wybenga ................ B29C 48/10 425/72.1 |
| 2018/0162032 | A1 | | 6/2018 | Hamada et al. |

FOREIGN PATENT DOCUMENTS

| | | |
|---|---|---|
| DE | 102005018548 A1 | 11/2006 |
| DE | 102016119281 A1 | 4/2018 |
| EP | 1595682 A1 | 11/2005 |
| GB | 1103756 * | 7/1965 |
| JP | H11-129315 A | 5/1999 |
| JP | H11-129316 A | 5/1999 |
| KR | 101286755 B1 | 7/2013 |

OTHER PUBLICATIONS

International Preliminary Report on Patentability for PCT Application No. PCT/EP2020/058852 mailed Sep. 28, 2021, with its English translation, 25 pages.
Decision to Grant for German Application No. 10 2019 127 454.0 mailed Jan. 27, 2023, with its English translation, 44 pages.
First Office Action for Chinese Application No. 202080038711.1 mailed Jan. 28, 2023, with its English translation, 15 pages.
Second Office Action for Chinese Application No. 202080038711.1 mailed Aug. 30, 2023, with its English translation, 11 pages.

* cited by examiner

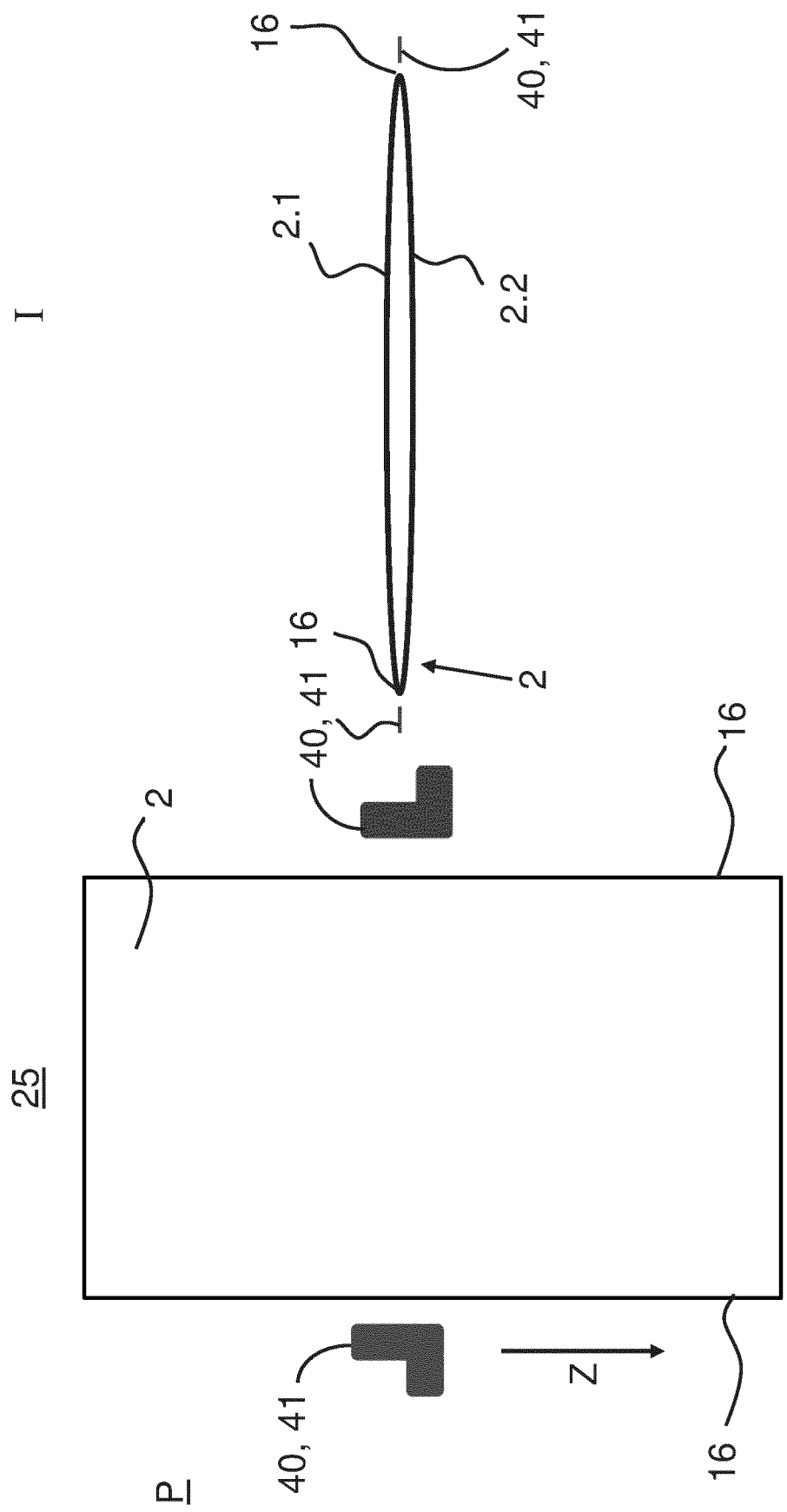

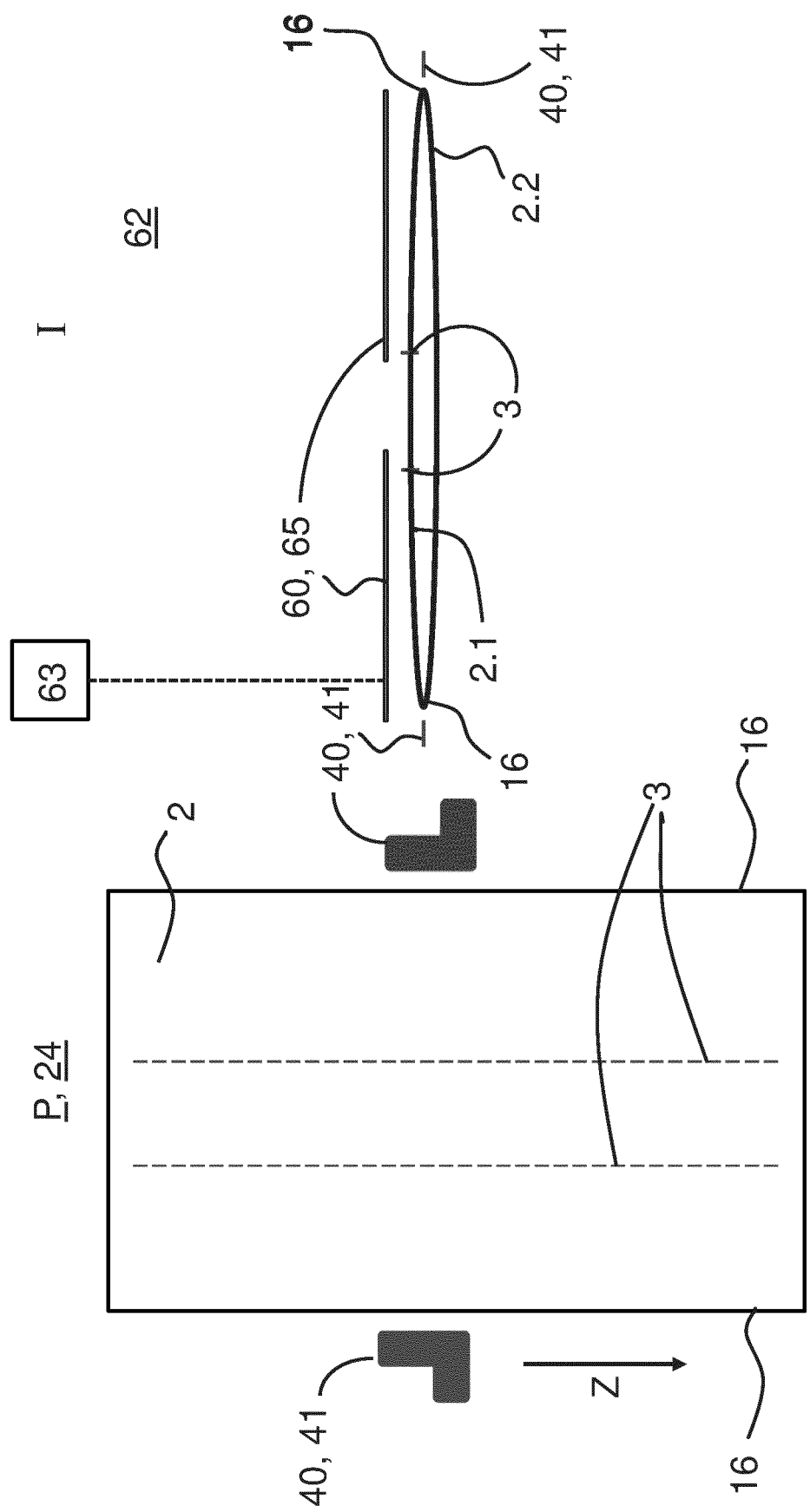

SYSTEM FOR THE IMPROVED INTRODUCTION OF A SEPARATING DEVICE AND BLOWN FILM LINE, AS WELL AS A METHOD FOR THE PRODUCTION AND SUPPLY OF AT LEAST TWO PLASTIC FILM WEBS IN A BLOWN FILM LINE

The present invention relates to a system for improved introduction of a separating device into a flattened film tube of a blown film line. In addition, the invention relates to a blown film line for producing and providing a plurality of plastic film webs and a method of operating said blown film line.

It is known from the prior art that film webs of plastic are produced by a blown film extrusion line. During production, a film tube is produced as a double-layered plastic film which is to be divided via cutting devices in order to obtain two film webs which are each fed to a winding point. In order to wind the flattened film tube onto two winding points, a side slitting knife must first be inserted into the flattened film tube, which often proves to be very complex, since this operation in particular is carried out manually by the worker.

It is therefore an object of the present invention to overcome, at least in part, the disadvantages described above. In particular, it is an object of the present invention to provide a system for improved introduction of a separating device into a flattened film tube of a blown film line, as well as to form a corresponding blown film line which can efficiently produce and provide multiple film webs. In addition, it is an object of the present invention to provide a corresponding method for optimized production and provision of multiple film webs of plastic in a blown film line.

The object is solved by a system having the features of the present disclosure, a blown film line having the features of the present disclosure, and by a method having the features of the present disclosure. Further features and details of the invention result from the respective dependent claims, the description and the drawings. Features and details which are described in connection with the system according to the invention are of course also valid in connection with the blown film line according to the invention as well as the method according to the invention, and vice versa in each case, so that with regard to the disclosure concerning the individual aspects of the invention reference is or can always be made mutually.

The object is solved in particular by a system for improved introduction of a separating device into a flattened film tube of a plant, in particular a blown film line. Thereby the invention provides a cutting device for cutting through only a first tube side of the film tube, in particular the film tube which has not yet been flattened. Further, the system comprises an opening device arranged downstream of the cutting device in the transport direction of the film tube, for opening the flattened film tube along the cut film tube in order to introduce the separating device into the flattened film tube.

An advantage of the invention is that, by means of the opening device, the flattened film tube can be opened in such a way that a particularly large opening is created through which the separating device can be introduced. Advantageously, the cutting device is operated in a fully automated manner within the system without the need for manual intervention by the worker. The cutting device effects at least one severing cut on the film tube, through which the separating device can subsequently be inserted. The severing device may be inserted manually by the worker, or likewise fully automatically into the flattened film tube. Preferably, the film tube comprises a plastic material or is made of plastic material. However, the film tube may also be understood to comprise a tube made of another material.

According to a further advantage, it may be provided that the cutting device comprises at least one cutting element for effecting a severing cut on the film tube, in particular that the cutting device comprises two cutting elements. Preferably, two severing cuts are effected on the film tube, wherein only a first tube side of the film web is cut. The film tube with the severing cuts is further transported towards the opening device. Once the severing cut has reached the opening device, the opening device can pass through the severing cut and cause opening along the cut film tube. This allows the separating device to be easily inserted through the opened film tube. In the inserted state of the separating device within the flattened film tube, a severing of the film tube takes place along its two opposing folding lines or crease lines, so that two separate film webs are formed. In particular, the severing cut may have a length of up to 10 m, preferably from 2 m to 10 m. Advantageously, the length of the severing cut may be adapted to a dimension of the opening device, in particular of an opening element of the opening device.

Furthermore, it is advantageous if the at least one cutting element is movable transversely to the transport direction of the film tube. For example, a cutting element may be provided only to effect a respective severing cut on the film tube. After a certain short time, the cutting element can be moved out of the film tube and displaced in its position transversely to the transport direction of the film tube in order to separate the film tube there again, a second severing cut thereby being made on the film tube which runs parallel to the first severing cut. The downstream opening device can in each case use both severing cuts in order to effect opening of the film tube there.

Preferably, it may be provided that the cutting device comprises a control for moving the at least one cutting element, in particular for moving the cutting element transversely to the transport direction of the film tube. The control may also be provided to move the cutting device from an activation state to a deactivation state and vice versa, wherein in the activation state only a first tube side of the film tube is cut by the cutting device and in the deactivation state the cutting device is spaced apart from the film tube. In particular, the cutting element may be movable towards the film tube by the control to enable cutting into the first tube side.

According to a further advantage, it may be provided that two cutting elements are provided which have a fixed distance to each other. The two cutting elements can further be moved by the control, namely into the active or into the deactivation state, for example the cutting elements can be pivoted into or out of the film tube. As a result, two severing cuts can be made in the film tube so that an opening, preferably symmetrical, of the film tube is possible on opposite sides. In particular, the opening device may comprise two opposing opening elements in order to be able to engage in the severing cuts that can be introduced by the two cutting elements. This may advantageously allow one of the film sections to be lifted off on both sides, thereby allowing the separation device to be inserted on both sides.

In a further possibility, it can be provided that the opening device comprises at least one opening element, wherein the opening element can be introduced into the separation cut, in particular obliquely to the transport direction. Advantageously, the opening device has two opening elements which can each be introduced into a severed section of the film tube. Advantageously, the opening elements can already be in contact with the film tube which has not yet been cut through and/or can be in contact with the film tube. As soon as the severing cut is reached, the opening elements penetrate the film tube in the region of the severing cut, an opening effect thereby taking place on the film tube. An easy opening of the film tube can be achieved by an oblique introduction of the opening element into the severing cut. In particular, the opening element can be insertable by an oblique movement at least in regions between the film webs lying one on top of the other. Preferably, the opening element is movable along two axes. For example, the opening element may be movable simultaneously or successively along the axes. Furthermore, it is conceivable that the opening element is movable along a guide slot and/or a cam plate.

It is further conceivable within the scope of the invention that the at least one opening element is movably mounted, in particular that the opening device comprises a control which is operatively connected to the at least one opening element. As a result, the opening element can be actively introduced into the film tube to enable the opening. Furthermore, the control of the opening device can be controllable as a function of a transport speed of the film tube and/or as a function of the cutting device.

It may be advantageous if, within the scope of the invention, the opening element is of hook-like and/or bolt-like configuration, in particular wherein the hook-like opening element serves for further severing of the flattened severing tube along the severing cut. A hook-like and/or bolt-like embodiment of the opening element can enable advantageous introduction of the opening element into the film tube. In particular, this may enable a punctual lifting of the first tube side from the second tube side.

Furthermore, it is conceivable in a system according to the invention that the opening device comprises an opening sensor by which an introduction of the opening element into the film tube can be detected, in particular wherein the opening sensor is arranged on the opening element in such a way that an inner side of the first tube side can be detected by the opening sensor when the opening element is inserted. By the inner side of the first tube side can in particular be understood to mean an inner surface of the film tube. In particular, the inner side of the first tube side faces an inner side of the second tube side. By means of the opening sensor and the detection of the film tube, a detection signal can be output which signals, for example to a control unit, that an opening of the tube has occurred. If the introduction of the opening element from the first tube side, in particular diagonally, into the severed section takes place, the detection of the inner side of the first tube side can form an indication that the opening element is located between the first and second tube sides and that the first and second tube sides have thus been successfully separated. If, for example, there is no detection of the inner side of the first tube side within a predetermined period of time, an error may be output. Advantageously, the opening sensor may be an optical sensor. Thus, in particular, the film tube can be detectable irrespective of the film material.

It is further conceivable in a system according to the invention that an anti-adhesion device for locally changing an adhesion property of an inner side of the film tube is provided, in particular wherein the anti-adhesion device is arranged upstream of the opening device in the transport direction of the film tube and/or is integrated in the cutting device or is coupled to the cutting device. In particular, the anti-adhesion device may comprise a nozzle for spraying the film tube, in particular an inner side of the film tube, with an anti-adhesion agent. The anti-adhesion agent may comprise, for example, an oil and/or a silicone spray. Furthermore, it is conceivable that the anti-adhesion agent comprises a powder by which the adhesion property can be changed. By the adhesive property may be meant an adhesion of the first and second tube sides to each other, in particular after the film tube has been flattened. In particular, the adhesive property may be an electrostatic attraction of the first and second tube sides. By locally changing the adhesive property at the inner side of the film tube, an introduction of the opening element and/or the separating element may be simplified. By integration into the cutting device or coupling with the cutting device, it can be ensured that the adhesive property is changed in the region of the severing cut, in which subsequently also the opening and/or separating of the film tube can be carried out.

Furthermore, in a system according to the invention, it is conceivable that the opening device is configured to stretch a second tube side of the film tube opposite the first tube side in such a way that a stretching force of the second tube side exceeds a retaining force between the first and second tube sides. The retaining force may result from adhering the first and second tube sides together, particularly after the film tube has been flattened. In particular, the retaining force may be an electrostatic attraction of the first and second tube sides. Thus, in particular, the retaining force may be due to an adhesive property of the first and second tube sides. When the opening member is inserted into the severing cut, the opening member may be pressed against the second tube side, causing the second tube side to undergo stretching. In particular, it may be provided that the film tube is biased for transport along the transport direction. Due to the retaining force, the first tube side will initially follow the stretching of the second tube side until the pre-tensioning of the film tube causes the first tube side to detach from the second tube side. This may allow for an advantageous opening operation.

Furthermore, in a system according to the invention, it can advantageously be provided that a deflection unit is provided for deflecting the film tube, in particular the deflection unit has an air supply by means of which an air cushion can be formed between the film tube and the deflection unit, preferably between a second tube side of the film tube and the deflection unit. When deflecting the film tube, a transport direction of the film tube may be deflected within the system. As a result, a transport distance of the film tube can be extended without changing a system length. Furthermore, the deflection can be used to cool the extruded film tube. The air cushion can enable a contactless deflection. Thereby, it is not necessary that the film tube touches the deflection unit. Thus, it can be avoided that a surface of the film tube is scratched and/or particles are pressed into the film tube. Thus, the quality of a film product producible from the film tube may be improved. If the air cushion is provided between the second tube side of the film tube and the deflection unit, it can further be prevented that air is blown into the film tube and that the film tube inflates locally.

It is further conceivable in a system according to the invention that a constriction point is provided at which a width of the film tube can be reduced, wherein the cutting device is arranged relative to the constriction point and the deflection unit in such a way that air accumulated between the constriction point and the deflection unit can be released by the severing cut which can be effected in the film tube by the cutting element of the cutting device. Between the constriction and the deflection unit, air can accumulate during the production of the film tube, which is located inside the film tube. Thereby, the accumulated air may be trapped between the constriction and the deflection unit, such that an air bubble formed thereby grows during production of the film tube. As a result, quality properties of the film tube may be negatively affected if the film tube stretches in the region of the accumulated air and/or is pressed against the deflection unit due to the increased internal pressure. The cutting device, in particular the severing cut, creates a tube section that allows fluid communication between an inner region of the film tube and an outer region of the film tube. This may provide access to the accumulated air, which may escape when the cut tube section passes the accumulated air region. Thus, the accumulated air may be relieved by the cutting device, particularly as a result of a skillful arrangement of the cutting device.

The invention includes that a contact unit is provided, in particular the opening device comprises the contact unit, wherein the contact unit can be brought or moved between an active position and a passive position, wherein in particular in the active position the contact unit moves the flattened film tube into a position or contacts it in such a way that a reliable movement of the separating device into the film tube and/or out of the film tube is enabled. The advantage with respect to the use of the contact unit is that a collision during the movement of the separating device with the film tube is prevented. For example, it is conceivable that the contact unit presses against the flattened film tube, so that a sufficiently large distance to the path of movement of the separating device is created, so that this separating device can move into/in front of the film tube or out of the film tube. Likewise, it is conceivable that by means of a contactless action of the contact unit, for example by means of compressed air or blown air, the flattened film is brought out of its starting position so that a sufficiently large distance to the path of movement of the separating device is created. This means that the contact unit remains immobile between the two positions.

According to the invention, it may be provided that the contact unit is transferable into a passive position in which the contact unit is spaced apart from the film tube. The contact unit assumes the passive position, for example, when the separating device is in its operating position in order to separate the flattened film tube into two separate film webs.

In addition, the invention comprises that the contact unit can be brought or moved into the respective position via a control, wherein in particular the contact unit is in operative connection with the opening device. The control may be pneumatic and/or hydraulic and/or electromechanical, in order to transfer the contact unit from a passive position to an active position and vice versa. Furthermore, the invention includes that the opening device comprises the same control for moving its opening elements as is suitable for the contact unit. Alternatively, separate controls may be provided for the contact unit and for the opening device.

The contact unit according to the invention can be movably arranged on a frame in such a way that the contact unit is oriented perpendicular to the transport direction of the film tube and parallel to the orientation of the film tube. The opening device may also be attached to the frame, for example. The control for the contact unit may exert a lifting movement for moving the contact unit into its respective position. A rotational and/or pivoting movement of the contact unit is also conceivable for the contact unit to assume its respective position. The control for the contact unit may, for example, comprise a servomotor which is connected to a deflection rod guided in a link guide, the deflection rod simultaneously acting on the contact unit. Advantageously, when the contact unit is moved into its respective position, the movement of the opening device is simultaneously performed. Advantageously, the contact unit is bar-shaped and extends transversely to the transport direction of the film tube. The elongated stretching of the contact unit has the effect that, in the active position of the contact unit, the flattened film tube is located far enough from the path of movement of the separating device, as a result of which a risk of collision during the movement of the separating device with the film tube is prevented.

Advantageously, it is provided that the cutting device is configured to effect two severing cuts on the film tube, the opening device having two opening elements, each opening element being insertable into a respective severing cut. The contact unit may comprise two contact elements which are movable such that, in the active position of the contact unit, the contact elements act on the flattened film tube having two opposite folding lines, and the first contact element is located between the first folding line and the first severing cut and the second contact element is located between the second folding line and the second severing cut. The severing cuts may be made simultaneously or may be made sequentially by the cutting device on the film tube.

Advantageously, the contact elements are located on a level with respect to each other so that, in the active position of the contact unit, the film tube can be uniformly guided out of the travel path of the separating device. When the separating elements of the separating device are inside the film, in particular in their operating position, the separating elements of the separating device cut the flattened film tube at its two folding lines into two separate film webs.

It is also an object of the invention to provide a blown film line for producing and supplying a plurality of film webs made of plastic, having a blow head from which a film tube can be extruded. In this case, it is provided that the film tube can be conveyed along a transport direction, the blown film line being provided with a flattening device which is arranged downstream of the die head and by means of which the film tube can be flattened as a double-layer plastic film. Further, the blown film line comprises a separating device configured such that the flattened film tube is separable into two separate film webs. Furthermore, the blown film line comprises a system for improved introduction of the separating device into the flattened film tube comprising a cutting device for cutting only a first tube side of the film tube, in particular of the not yet flattened film tube, for opening the flattened film tube along the separated film tube in order to introduce the separating device into the flattened film tube. Further, the blown film line comprises a control unit for causing the film tube to move along the transport direction. Preferably, the control unit is located downstream of the system. In addition, two winding points are provided, wherein a film web can be fed to each winding point.

Thus, the blown film line according to the invention provides the same advantages as described in detail with reference to the system. Preferably, the cutting device is arranged in the transport direction of the blown film tube downstream of a frost line position and/or in a calibration device. The calibration device may be configured to limit a diameter of the film tube and/or reduce a temperature of the film tube. During extrusion from the die head, a film material of the film tube is present, in particular, as an at least partially liquid mass which is cooled from a certain exit length to such an extent that the film material becomes solid. This position may be referred to as the frost line position. By arranging the cutting device after the frost line position, a severing cut can be advantageously introduced in solidified film material, since further deformations of the cut are not to be expected, which would be impossible or difficult to control in particular before the frost line position due to the viscosity of the at least partially liquid film material.

The separating device may be provided separately from the opening device or may be at least partially integrated into the opening device. In particular, the separating device may comprise a separating element connected and/or coupled to an opening element of the opening device. This may automatically ensure a correct positioning of the separating element after opening. Preferably, the separating device is provided for mechanically separating the film tube into two separate film webs. Furthermore, it may be provided that the opening device is upstream of the control device.

It is also advantageous if two film webs can be produced simultaneously and fed to the respective winding point. This can increase the overall productivity of the blown film line.

Of further advantage, it may be provided that the cutting device is arranged in the flattening device or is arranged downstream of the flattening device. Advantageously, the cutting device is located in the flattening device so that only a first tube side of the film tube is cut. Since the film tube is not yet flattened, there is less risk that the film tube is cut through by the cutting device towards both tube sides. Alternatively, it is also conceivable that the cutting device is positioned downstream of the flattening device, which means that when the film tube is flattened, the cutting device only cuts through a first tube side of the film tube. The lower film web may only be scored, but not cut through.

Furthermore, it is conceivable that the cutting device has a control in order to bring the cutting device from an activation state into a deactivation state and vice versa, wherein in the activation state only a first tube side of the film tube is cut by the cutting device and in the deactivation state the cutting device is at a distance from the film tube. Furthermore, it is conceivable that the opening device comprises a control for moving the opening device from an active position into a passive position and vice versa, wherein in the active position an opening effect can be effected on the flattened film tube and in the passive position the opening device is spaced apart from the film tube. Thus, an automation of the blown film line and/or a temporary change of state of the cutting device and/or the opening device may be enabled. In particular, the control does not require an operator to manually adjust the cutting device and/or the opening device. The control of the opening device may in particular be a pneumatic control. Additionally or alternatively, it may be provided that the opening element is configured as a compressed air nozzle for opening the film tube by means of a, in particular directed, compressed air supply. In this way, a contactless opening of the film tube can be made possible.

In a further possibility, it may be provided that the separating device comprises a control for moving the separating device into the film tube at least partially opened by the opening device. In particular, the separating device may be insertable fully automatically into the opened film tube. In this way, a process-reliable introduction of the separating device into the film tube can be effected. At the same time, rejected material of film can be reduced if the introduction of the separating device can be carried out in a process-safe manner and, in particular, a manual, possibly complex, opening of the film tube and/or positioning of the separating device is not necessary. Furthermore, it is conceivable that the separating device is integrated into the opening device.

In this way, the flattened film tube can be separable into two separate film webs immediately as soon as the film tube is opened.

According to a further possibility, it may be provided in a blown film line according to the invention that the blown film line comprises a control unit, preferably for coordinating the cutting device and the opening device, in particular wherein the control unit acts on at least one of the controls. Advantageously, the control unit, which may be a control and/or regulation unit, is in data communication with one or all of the controls, particularly with the control of the separating device and/or the control of the opening device and/or the control of the cutting device and/or the control unit responsible for moving the film tube along the transport direction. Preferably, the control unit may comprise a processor and/or a microcontroller. The control unit may further be part of the system, and/or one of the winding points. Thus, an increased automation of the blown film line can be achieved. In coordinating the cutting device and the opening device, in particular a transport speed and/or a transport path of the blown film tube in the transport direction of the blown film tube may be taken into account. Thus, coordination of the opening device with the severing cut can be achieved by the control unit. The coordination may be performed directly by coordinating control signals of the cutting device with control signals of the opening device. Furthermore, it is conceivable that the coordination takes place indirectly, for example by detecting the severing cut via a sensor device and controlling the opening device as a function of the detection of the severing cut. Preferably, the control unit may further be configured to coordinate the cutting device and/or the opening device with the separating device and/or a movement of the film tube. This may ensure that the separating device is actuated on the correct side of the film tube and/or at the correct time.

Furthermore, in a blown film line according to the invention, it may advantageously be provided that the control unit comprises an activation module for controlling the cutting device for performing, in particular once, the cutting of the first tube side during a activation of the blown film line. During the activation of the blown film line, a reject material of film may be generated, which may be reducible by an efficient opening of the film tube and an efficient introduction of the separating device. Furthermore, the cut tube section can be allocated to the reject material in a simple manner so that a continuous material of the tube film can subsequently be used at the winding points. Further, it may be useful, particularly during activation of the blown film line, to open the film tube if the separating device has not yet been inserted into the film tube during activation. Subsequently, the separating device may remain in a severing position so that the film tube is continuously cut. The activation of the blown film line may in particular be understood as the creation of a new film tube. In particular, a production of the blown film line may be stopped and/or interrupted before the activation. The activation of the blown film line thus provides a convenient time for controlling the cutting device.

Furthermore, in a blown film line according to the invention, it may advantageously be provided that the control unit comprises a winder module for detecting a winding change at at least one of the winding points and for carrying out, in particular once, the severing of the first tube side when the winding change is detected. A winding change may comprise a transverse severing of the entire film tube. Thus, during the winding change there may be a convenient time to restart the blown film line and/or to cut out a part of the film tube from the film tube. In this way, the severed cut is not introduced into the film product or can be arranged in a simple manner at the start of the winding or at the end of a winding. In this way, damage to film products of the winding points as a result of the severing cut can be avoided.

Furthermore, in a blown film line according to the invention, it may advantageously be provided that the control unit comprises a protocol module for generating a winding protocol, in particular a digital winding protocol, by means of which a position of the cutting of the first tube side for at least one film web can be assigned. The digital winding protocol may comprise information about a winding made from the film tube. By creating the winding record, the cut tube section can be located and taken into account during a further processing of the winding. As a result, it may not be necessary to remove the incised tube section from the film web prior to winding, for example. This can increase the production speed and/or reject material.

It is further conceivable in a blown film line according to the invention that an additional separating unit is arranged upstream of the winding points in the transport direction of the film tube, which additional separating unit comprises a further opening device for detaching the first tube side from a second tube side, in particular the separated film webs from one another, and/or at least one transverse separating means for separating a head region of the flattened film tube. Preferably, the additional separating unit is arranged downstream of the separating device in the transport direction of the film tube. Thus, it may be provided that the film webs are laid on top of each other again after being separated by the separating device. This can result in a simplified transport. The additional separating unit can thus provide a second opening process before the winding points are reached, which is configured in particular analogously to the first opening process for the separating device. Before the winding points, in particular when the blown film line is started up, the film tube can be completely cut by the transverse severing means transversely, in particular perpendicularly, to the transport direction, in order to sever the head region. By the head region may be understood a contiguous region of the film tube, which is located in particular in the transport direction of the film tube upstream of the severing cut. Thus, a division of the film webs to the winding positions can be simplified by the additional separating unit.

A further advantage within the scope of the invention is achievable if a sensor unit checks the moving film tube along the transport direction and is in communication with the control unit and/or with the control of the cutting device and/or with the control of the opening device and/or with the control of the separating device. The sensor unit can check the condition of the film tube or detect the one or the other severing cut, whereby the control unit can use this information to check or control the respective controls.

Furthermore, it is preferably provided that the separating device comprises separating elements, in particular two, for cutting through the flattened film tube at two positions. The separating elements may be side slit blades, which cut through the material in particular at folding lines of the flattened film tube. This can enable an advantageous separation of the film tube into two film webs.

Furthermore, the separating device may comprise at least one guiding element for guiding a severing of the first tube side to at least one of the separating elements. The guiding element may be configured as a non-cutting guiding element for guiding the film tube, in particular the first tube side of the film tube. This may ensure that the severing cut, which has previously been introduced into the first tube side by the separating device, can be picked up and/or continued by the severing device. In particular, a plurality of guiding elements, preferably two, may be provided for each severing element. Furthermore, the guiding elements may be arranged in a V-shape.

It is further conceivable that the separating elements are movable perpendicular to the transport direction of the flattened tube film as well as parallel to the flattened tube film level. This means that the separating elements can be moved towards one and the other first tube side of the flattened tube film in order to effect a severing of the material at both folding lines. Thus, it is conceivable that two severing cuts can be made in the film tube in a central region of the first tube side by the cutting device. By moving the severing elements, the severing elements may first be insertable into the film tube and, in particular in dependence on a diameter of the film tube, be movable towards the folding lines. In particular, the film tube moves in the transport direction during this, the severing cut can thereby be extended until the severing elements have reached the folding lines.

It can be provided that the opening elements can be moved obliquely to the tube film level. In this case, the opening element is advantageously configured in the manner of a bolt, which enables simplified opening of the film tube that has already been cut. Via the oblique angle, the opening element penetrates into the film tube in a process-safe manner and can thus have the purpose of opening the film tube. Thereby, a second tube side of the film tube may further be stretchable such that a stretching force of the second tube side exceeds a retaining force between the first and second tube sides. Thus, opening of the film tube may be enabled in a simple and process-safe manner.

According to the invention, a contact unit may be provided which is movable between an active position and a passive position, wherein in the active position the contact unit positions the flattened film tube such that reliable movement of the separating device into and/or out of the film tube is enabled. Advantageously, in its active position, the contact unit contacts the flattened film tube to move it out of the travel path of the separating device. The transfer of the contact unit to the active and passive positions may be motionless, that is, the actual position of the contact unit is the same in the active and passive positions. In this case, contactless the contact unit may, for example via compressed air or blown air, hold the film tube out of the travel path of the separating device. It is also conceivable that the contact unit performs a movement between the active and passive positions and, in the active position, contacts the flattened film tube.

Advantageously, the separating device is arranged downstream of the contact unit and the opening device in the transport direction of the film tube. Furthermore, it is conceivable that the contact unit is arranged downstream of the opening device in the transport direction. Furthermore, the invention may also comprise that the control unit is provided for coordinating the contact unit.

According to a further aspect of the invention, it may be provided that in the activation state of the cutting device the flattened film tube comprises at least one severing cut at the first tube side, wherein in particular the flattened film tube comprises two severing cuts at the first tube side, which are arranged parallel to each other or are arranged offset to each other. The opening device, in particular the two opening elements, can move into each of the severing cuts, thereby creating an opening for the separating device so that it can be reliably moved into or out of the film tube.

Furthermore, it is conceivable in the blown film line according to the invention that the system can be operated in a retraction process and in an extension process, wherein in the retraction process the separating device can be automatically transferred from a parking position, in which the separating device does not effect a severing of the film tube, into an operating position, in which the separating device effects a severing of the film tube at its folding line and/or folding lines. In the parking position, the separating device is located outside the film tube or has a defined distance from the film tube. Advantageously, the control unit controls the retraction process as well as the extension process, which is controlled and operated fully automatically within the blown film line.

Preferably, in the blown film line according to the invention, it can be provided that a central region of the film tube and two side regions of the film tube are formed between the two severing cuts, the side region being bounded by a folding line of the film tube and the facing severing cut. According to the invention, the contact unit with its respective contact element in its active position lies directly against the first and second side regions of the film tube. In the active position of the opening device, the opening device is located at least partially in the central region of the film tube, whereby an opening on the film tube is moved so that the separating device can be moved out of the film tube or into the film tube.

Furthermore, the blown film line according to the invention may provide that the separating device is transferable into a central position for the retraction process and the extension process, in which the separating device is located at least partially in the central region within the film tube, wherein in particular the opening device is located in the active position. According to the invention, in the retraction process the separating device performs a movement from its parking position to the central position and subsequently towards the operating position. In the extension process, on the other hand, a movement of the separating device from the operating position first takes place into the central position and subsequently into the parking position. Advantageously, for the retraction process and for the extension process, the contact unit acts on the side region of the film tube, which ensures a reliable movement of the separating device without colliding with the film tube.

Furthermore, in the blown film line according to the invention, it is conceivable that the retraction process and the extension process take place fully automatically, without the worker having to manually intervene to insert the separating device within the flattened film tube or to guide it out. This can significantly reduce production costs, while at the same time increasing safety for the worker.

According to the invention, the contact unit may be a deflection roller for the flattened film tube to be transported, which can be brought at least between the activation and the active position, whereby the film tube can be effectively brought out of the transport path of the separating device.

Furthermore, the blown film line according to the invention may provide that an additional cutting device is provided which can be brought into an operating mode and a sleep mode, is positioned at a distance from the film tube in the sleep mode and introduces an additional cut through both tube sides of the film tube in the operating mode. It is conceivable that due to process disturbances, such as width variations of the film tube, separator element malfunction of the separating device, it may be necessary to intervene immediately in the manufacturing process of the blown film line to avoid major disturbances. In case of a defect of a separating element, this would have the consequence that only one side of the film tube would be cut, with the consequence that only one winding point would wind up the film tube. The film tube slit on one side would disadvantageously lead to flat web losses. It would be necessary to retract the winding point, which would result in a high loss of material. If now a separating element would move from an operating position inside the film tube due to a process disturbance, the additional cutting device moves into the mentioned operating mode and makes the additional cut through both tube sides of the film tube. This "rescue function" has the effect that, in the event of such a malfunction, both winding points continue to be supplied with one film web each. Advantageously, it is not necessary to stop the production process of the blown film line in such a case, which would be associated with high costs. Subsequently, the retraction process can be started automatically in order to transfer the separating element of the separating device automatically into the film tube.

Furthermore, in the blown film layer according to the invention, it can advantageously be provided that the additional cutting device is arranged downstream of the separating device in the transport direction of the film tube. Advantageously, the additional cutting device is also arranged downstream of the opening device in the transport direction of the film tube, so that the retraction process can be reliably started.

In another aspect of the invention, a detection means may be provided that detects at least one of the positions of the separating device, wherein in an incident in which the separating device moves from the operating position to the parking position, the additional cutting device changes from the sleep mode to the operating mode. The detection means may be, for example, a sensor that can detect the respective position of the separating element or the separating device. For example, this may be a pressure sensor or optical sensor to detect the position of the separating element. Alternatively, a detection means may be provided to detect to what extent a cut is made at the folding lines of the film tube. This can be done, for example, by means of an optical sensor. If no cut is made on one side of the film tube by the separating device, the additional cutting device can be controlled to move into its operating mode. Advantageously, a control unit is provided which is in data communication with the cutting device, opening device. Separating device, contact unit, additional cutting device as well as detection means.

Advantageously, the separating device may be configured with a control which has an active element for bringing the separating elements into the respective position. In the operating state, the active element can exert a certain tension force on the separating element so that a satisfactory severing of the film tube at the folding line takes place. The active element may be a cable pull. Alternatively or additionally, the active element may comprise a spring element or a pneumatic cylinder with to allow this tension force to act on the separating element.

According to a further aspect of the invention, there is claimed a method of manufacturing and providing at least two or more film webs of plastic, in particular by a blown film line according to the invention. In this regard, the method comprises:

Extrusion of a film tube, in particular from a die of a blown film line,

Severing, preferably by a cutting device of the blown film line, of only a first tube side of the film tube, in particular before the film tube is flattened, Flattening of the film tube to form a double-layer plastic film, in particular by a flattening device of the blown film line, Opening of the flattened film tube along the cut of the first tube side, in particular by an opening device of the blown film line, Separation of the flattened film tube into two separate film webs, in particular by a separating device of the blown film line.

In particular, a process according to the invention thus brings the same advantages as have already been described in detail with reference to a system according to the invention and/or a blown film line according to the invention. During extrusion, a film material of the film tube can be ejected from the die, in particular in an at least partially liquid state. The severing is preferably performed mechanically, for example by introducing a cutting element of the cutting device into the first tube side. Preferably, the film tube is moved along a transport direction during the process, in particular as a continuous material. During the cutting, the cutting element may be rigidly positioned, so that the cutting is performed automatically by a movement of the extruded film tube. When the flattened film tube is opened, in particular the first tube side is removed from a second tube side opposite the first tube side, so that the first and second tube sides are at least regionally spaced apart after opening. Thus, for separating the flattened film tube, separating elements can be placed in a simple manner at least partially in the separation cut, in order to enable automatic separation during further transport of the film tube. The separation of the flattened film tube is preferably performed by a relative movement of the film tube to the separating device. Thereby, the separating device may remain rigid in a separating position at least with respect to the transport direction of the film tube. Consequently, an active cutting movement of the separating device is not necessary during separation. Depending on a cutting pattern introduced into the film tube by the separating device, the film tube can be transferred into one or more, preferably two, film webs.

It is further conceivable in a method according to the invention that, for severing the first tube side, a cutting device is first brought into an activation state, in which the first tube side of the film tube is cut by the cutting device, and is then brought into a deactivation state, in which the cutting device is at a distance from the film tube. Thus, in a simple manner, a deactivation of the cutting device can be provided when the severing cut, in particular with a predetermined cut length, is made in the first tube side. Thus, further damage to the film tube can be avoided, so that the severing cut is present only locally for opening the film tube in a single tube section.

Furthermore, in a method according to the invention it may advantageously be provided that for opening the flattened film tube the opening device is brought into an active position in which an opening effect is effected on the flattened film tube and is subsequently brought into a passive position in which the opening device is spaced apart from the film tube. When the film tube is opened and in particular the separating device is inserted into the film tube, it may be provided that the opening device is no longer required. In the passive position, further intervention of the opening device in the manufacturing process of the film can be avoided.

It is further conceivable in a method according to the invention that the cutting of the first tube side and the opening of the flattened film tube are performed at different positions along the transport direction of the film tube and are automatically coordinated. Thereby, the operation may be automated and thus an efficiency in the film production may have been increased. Preferably, the automatic coordination may be performed by a control unit of the blown film line. For this purpose, control signals for cutting and for opening the blown film tube can be coordinated. Furthermore, it is conceivable that the severing cut is detected and the opening is performed depending on the detection of the severing cut.

Preferably, in a method according to the invention, it can be provided that, when the flattened film tube is opened, an opening element is introduced into the severing cut, in particular diagonally to the transport direction of the film tube. As a result, the opening element can advantageously be introduced between the first tube side and a second tube side opposite the first tube side in order to separate the tube sides from one another, at least in sections. Thus, the separating device can be inserted into the film tube in a simple manner.

Preferably, in a method according to the invention, it may be provided that the flattened film tube is cut at two positions when the first tube side is cut. In particular, this may allow the film tube to be opened on both sides during opening. In this case, a central region of the first tube side can remain continuous, so that further transport of the film webs can be made possible, in particular without additional measures, even after the flattened film tube has been cut.

Furthermore, in a method according to the invention, it may advantageously be provided that, for separating the flattened film tube into two separate film webs, separating elements are moved perpendicularly to the transport direction of the flattened film tube parallel to a flattened tube film level. The flattened tube film level may be understood to be a flat extension of the first and second tube sides, in particular wherein the first and second tube sides extend parallel and are contiguous only in the edge regions of the flattened tube film. By moving parallel to the tube film level, a separation in the edge regions can be achieved in particular in dependence on a diameter of the tube film, so that no or hardly any rejection of film material is produced by the edge regions. Thus, the blown film line can be operated efficiently even with alternating and/or varying diameters of the film tube.

It is further conceivable in a method according to the invention that the film tube is deflected after extrusion by a deflection unit for deflecting the film tube, in particular wherein an air cushion is formed between the film tube and the deflection unit, preferably between a second tube side of the film tube and the deflection unit. The air cushion enables a contactless deflection of the film tube at the deflection unit. Thus, damage to the film tube can be prevented. If the air cushion is formed between the second tube side of the film tube and the deflection unit, it can also be prevented that air is blown into the film tube and that the film tube inflates locally.

It is further conceivable in a method according to the invention that an adhesive property of an inner side of the film tube is locally modified for simplifying the opening of the flattened film tube at the severing cut. For this purpose, an anti-adhesive agent can advantageously be sprayed into the film tube, preferably onto an inner side of the first and/or second tube side. This may reduce a retaining force of the first and second tube sides after the film tube has been flattened, so that a subsequent opening operation may be simplified. Additionally or alternatively, the film tube may be cooled locally to change the adhesive property and/or prevent blocking of the film material.

Furthermore, in a method according to the invention, it is conceivable that, for opening the flattened film tube, a second tube side of the film tube opposite the first tube side is stretched in such a way that a stretching force of the second tube side exceeds a retaining force between the first and second tube sides. The retaining force may in particular be attributable to an adhesive property, for example in the form of an electrostatic attraction, of the first and second tube sides. During opening, in particular an opening element is pressed from the inside onto the second tube side, so that the film tube is stretched perpendicularly or obliquely to the transport direction. Due to a tension stress in the transport direction during transport of the film tube, both tube sides have a tendency to align in the tube film level. As a result, the first tube side, on which the opening device does not press, in particular due to the severing, detaches from the second tube side when the stretching force exceeds the retaining force.

Furthermore, in a method according to the invention, it is conceivable that the severing of the first tube side is carried out during an activation of the blown film line, in particular once. The activation provides an advantageous time for severing the first tube side, in particular if a head region of the film tube is produced as reject material during the activation anyway.

Furthermore, in a method according to the invention, it may advantageously be provided that a winding of at least one film web onto at least one winder, preferably of two film webs onto two winders, takes place, in particular wherein a severing of the first tube side takes place upon detection of a winder change. A winding change may be carried out in particular in dependence on a packaging of film products of the film tube. In this case, a full winding may be removed from the winding point and an empty winding roll may be provided at the winding point. For this purpose, the blown film line can advantageously be stopped or reduced in its production speed. Thus, a tube section damaged by the severing cut can be identified and/or removed in a simple manner.

It is further conceivable in a method according to the invention that a winding protocol, in particular a digital winding protocol, is created by means of which a position of the severing of the first tube side for at least one film web can be assigned. In this way, it may be possible, for example, to communicate the position of the severing and thus, in particular, of any damage to the tube section to a further processing process. Thus, it may not be necessary to remove the cut tube section already before winding.

Furthermore, in a method according to the invention, it may advantageously be provided that, prior to winding, a further opening of the film tube is carried out by detaching the first tube side from a second tube side, in particular by detaching the separated film webs from each other, and/or by severing a head region of the film tube flattened. Thus, a start of a winding operation may be simplified. The head region of the film tube may in particular comprise a continuous region arranged upstream of the severing cut in the transport direction of the film tube. The severing may in particular be performed by a cut transversely and/or perpendicularly to the transport direction completely through the film tube.

In particular, the method for producing and providing a plurality of plastic film webs in a blown film line having a blow head from which a film tube is extruded may be configured such that the film tube is conveyed along a transport direction. In this regard, the method may comprise that a flattening device downstream of the blow head by which the film tube is flattened as a double-layered plastic film. Furthermore, the method preferably uses a system for improved introduction of a separating device into the flattened film tube comprising a cutting device and an opening device, wherein the cutting device only cuts through a first tube side of the film tube, in particular cuts through the not yet flattened film tube. Furthermore, the opening device, which is arranged downstream of the cutting device in the transport direction of the film tube, can open the flattened film tube along the severed section of the film tube, the separating device being introduced into the opened film tube and separating the flattened film tube into two separate film webs, each film web being fed to a winding point.

A further advantage within the scope of the invention can be achieved if the cutting device can be brought from an active state into a deactivation state and vice versa, wherein in the activation state only a first tube side of the film tube is cut by the cutting device and in the deactivation state the cutting device is at a distance from the film tube, and/or the opening device can be brought from an active position into a passive position and vice versa, wherein in the active position an opening action is effected on the flattened film tube and in the passive position the opening device is spaced apart from the film tube, wherein after the separating device has been introduced into the film tube the cutting device is/are transferred into the deactivation state and/or the opening device is/are transferred into the passive position.

In particular, the method according to the invention may provide that in a retraction process the separating device is automatically transferred from a parking position, in which the separating device does not cause severing of the film tube, to an operating position, in which the separating device causes severing of the film tube at its folding line and/or folding lines. For the retraction process, the following can be performed according to the invention:
  a) Transferring the cutting device to the activation state at the beginning of the retraction process, so that at least one severing cut or two severing cuts are made on the first tube side of the film tube,
  b) Transfer of the opening device from the passive position into the active position, wherein in the active position at least one opening element, in particular two opening elements each protrude into a severed section,
  c) Transfer of the separating device from a parking position, in which the separating device does not cut the film tube, to an operating position, in which the separating device cuts the film tube at its folding line and/or folding lines.

In this regard, it is conceivable that said methods at least partially overlap in time. Importantly, the opening device is in the active position to cause an opening for the separating device on the film tube so that the separating device can reliably enter the film tube. The upstream cutting device causes the severing cut to be created for the opening elements.

Furthermore, it is conceivable in the method according to the invention that in a) a central region of the film tube and two side regions of the film tube are formed between the two severing cuts, the side region being bounded by a folding line of the film tube and the facing severing cut. Here it is advantageous that during c) the separating device is transferred into a central position, in which the separating device is located at least partially in the central region within the film tube, the opening device being in the active position, wherein in a g) the separating device moves from the central position into the operating position.

Advantageously, in c) a contact unit moves from a passive position, in particular in which the contact unit is spaced apart from the film tube, into an active position, wherein in the active position the contact unit acts on the side region of the film tube so that the separating device reliably moves from the parking position into the central position. Thus, a fully automatic retraction process of the separating device into the film tube can be realized.

Moreover, in the method according to the invention, it may advantageously be provided that after the separating device has reached the central position, the following takes place:
  d) Transferring the opening device from the active position to the passive position
  e) Transfer of the contact unit from the active position to the passive position.

Subsequently, in f), the cutting device may be transferred from the activation state to the deactivation state. If the separating device is in its operating position, a severing of the first tube side of the film tube by the cutting device can be cancelled.

Moreover, in the method according to the invention, it may advantageously be provided that in an extension process the separating device is automatically transferred from an operating position, in which the separating device effects a severing of the film tube at its folding line and/or folding lines, to a parking position, in which the separating device does not effect a severing of the film tube. In addition to the retraction process, an automatic extension process of the separating device from the operating position to the parking position is also possible. For the extension process according to the invention, the following steps may be performed:
  h) Transferring the cutting device to the activation state at the beginning of the extension process, so that at least one severing cut or two severing cuts are made on the first tube side of the film tube,
  i) Transfer of the opening device from the passive position into the active position, wherein in the active position at least one opening element, in particular two opening elements each protrude into a severed section,
  j) Transfer of the separating device from an operating position, in which the separating device effects a severing of the film tube at its folding line and/or folding lines, into a parking position, in which no severing of the film tube is effected by the separating device.

It is conceivable that said positions h), i), j) may overlap in time, for example j) may already start in time when with respect to i) the opening device has not yet reached its active position.

Advantageously, the method may provide that during j) the separating device is moved to a central position in which the separating device is at least partially in the central region within the film tube, the opening device being in the active position, wherein in k) the separating device moves from the central position to the parking position. The movement of the separating device from the active position towards the central position is opposite to the movement of the separating device from the central position towards the parking position. During the movement of the separating device from the central position to the parking position, the separating device is located outside the film tube, whereas during the movement of the separating device from the operating position to the central position, the separating device is located inside the film tube.

In addition, it is conceivable according to the invention that in i) a contact unit is transferred or moves from a passive position, in particular in which the contact unit is at a distance from the film tube, into an active position, wherein in the active position the contact unit acts on the side region of the film tube so that the separating device moves reliably from the operating position into the central position and into the parking position. i) takes place before k), so that the film tube does not collide with the separating device during its movement into the parking position.

Advantageously, the opening device remains in the active position while the separating device leaves the central position in the direction of the parking position. This creates a reliably functioning extension process.

The extension process is then only completed after the separating device has reached the parking position and the following have taken place:
  m) Transferring the opening device from the active position to the passive position
  n) Transfer of the cutting device from the activation state to the deactivation state.

The positions mentioned can be carried out sequentially or at least partially overlap in time.

In addition, the method according to the invention can be further embodied in that a detection means is provided which, during the production of the film webs, detects a malfunction in which the separating device, in particular a malfunctioning separating element, moves from the operating position into the parking position, as a result of which an additional cutting device is actuated in p) which, in an operating mode, makes an additional cut through both tube sides of the film tube, the additional cut being arranged downstream of the separating device in the transport direction of the film tube. Here, a flat web loss can be effectively prevented by immediately making an additional cut through both tube sides of the film tube by the additional cutting device in the event of said malfunction. This ensures that both winding points are fed with a film web, even if a separating element of the separating device unpredictably comes out of the operating position.

In particular, the method according to the invention may provide that the malfunctioning separating element is replaced by a functioning separating element, and subsequently the positions of the retraction process according to the invention are carried out for the now functioning separating element. Advantageously, the following according to the invention, which have already been described, are carried out:
  a)
  b)
  c).

Furthermore, the method according to the invention may provide that before the separating device, in particular the separating element moves from the central position towards the operating position, the cutting element moves into the deactivation state, the following take place:
  Movement of the separating device, in particular of the separating element from the central position towards the operating position
  Transferring the additional cutting device from the operating mode to the sleep mode in which an additional cut is not made, in particular is not carried out.

Both the system and the blown film line according to the invention, as well as the method according to the invention, enable an easier activation process to be carried out on the blown film line, which is particularly advantageous for untrained operating personnel. At the same time, an easier and more process-reliable introduction of the separating device into the film tube can be carried out. Productivity can be increased, since the introduction of the separating device can be carried out in a shorter time, in particular because the introduction of the separating device is automated. Moreover, it has been shown that the separating device can be inserted even at higher web speeds of the film tube, whereby productivity can be significantly increased. Since, according to the invention, the opening device can also be automated, a simplified separation of the individual film webs can be achieved, whereby the time saved in separating the film webs can be increased.

Figure 2:
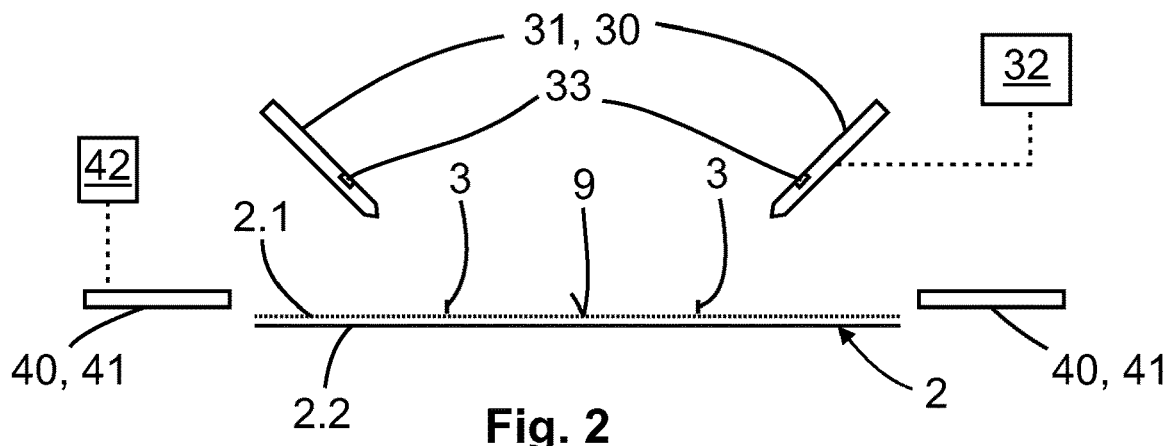
Figure 3:
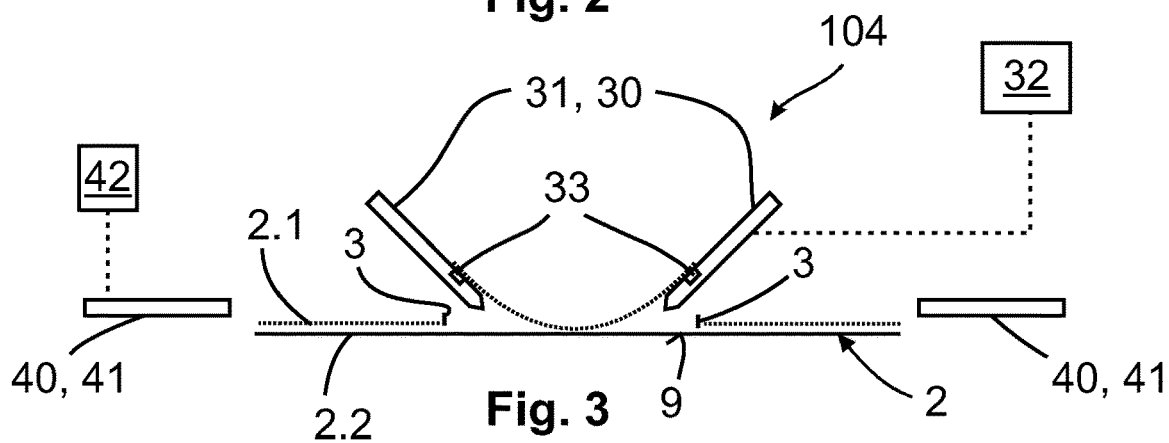
Figure 4:
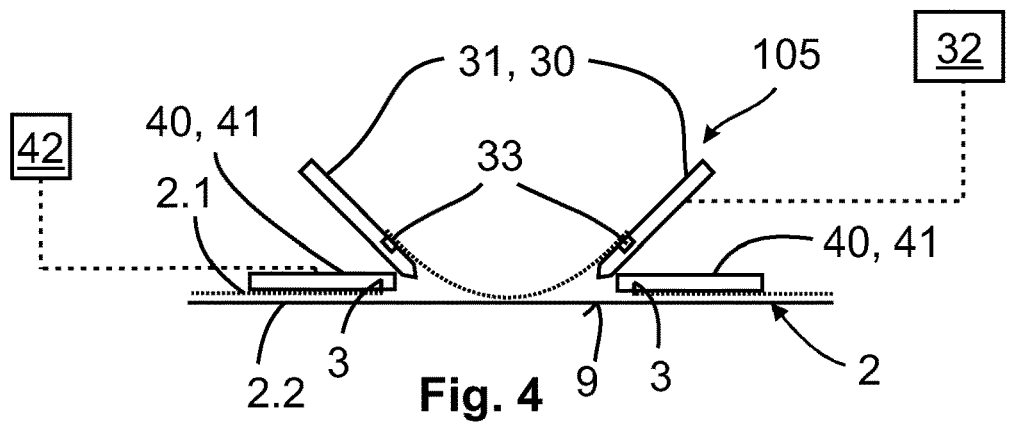
Figure 5:
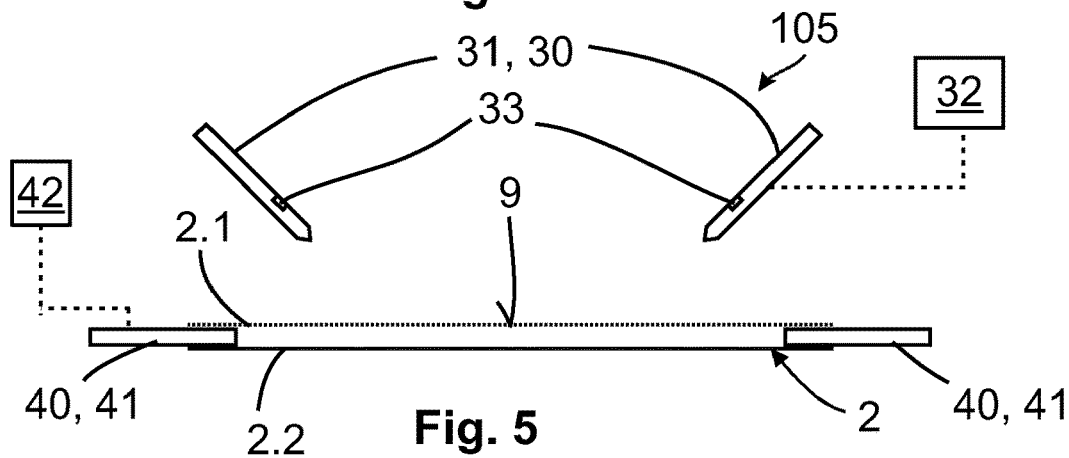
Figure 6:
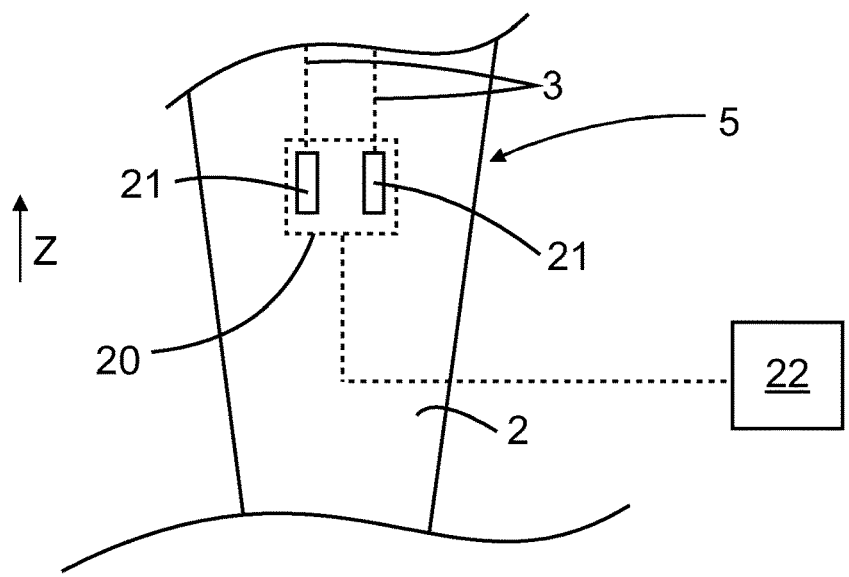
Figure 7:
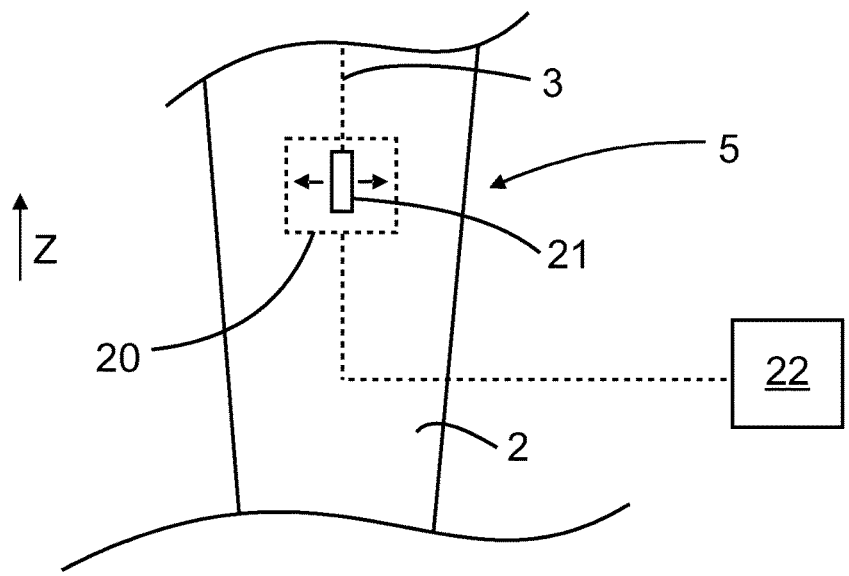
Figure 8:
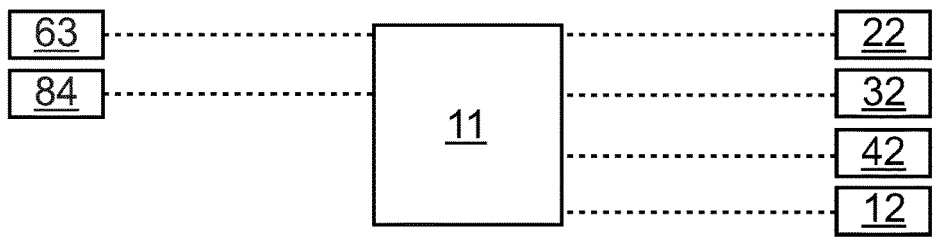
Figure 9:
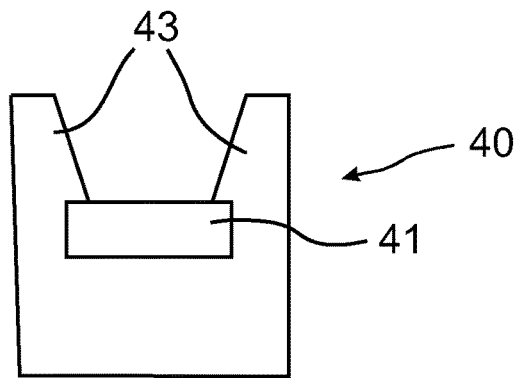
Figure 10:
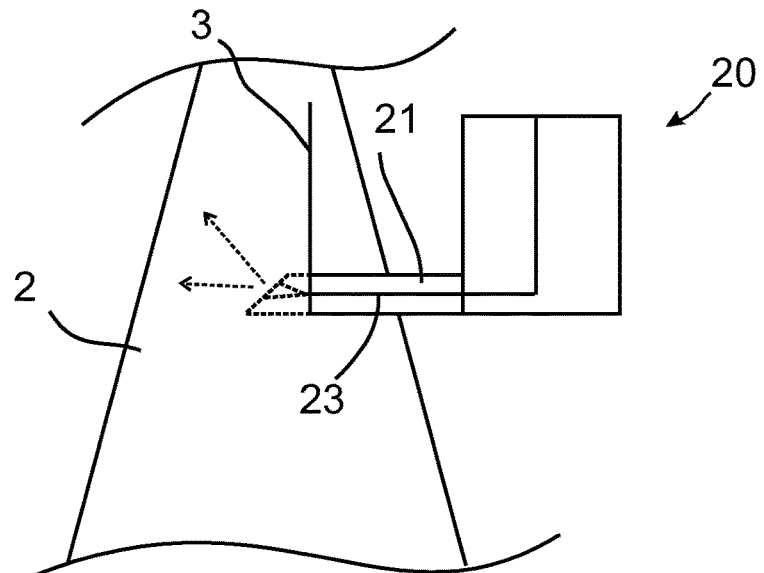
Figure 11:
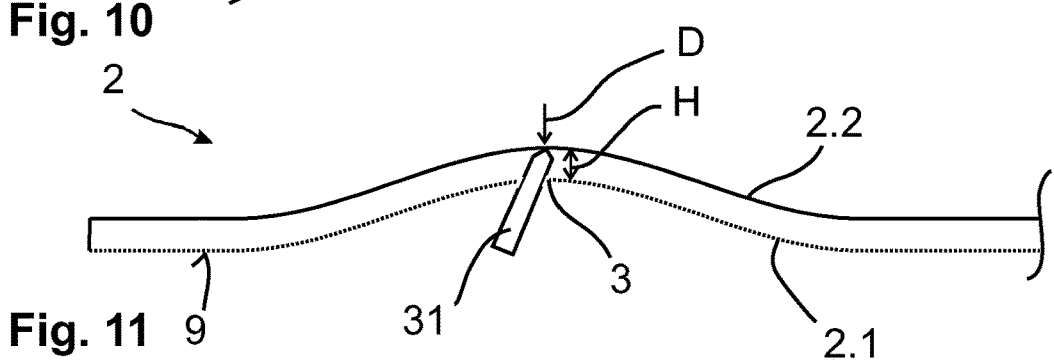
Figure 12:
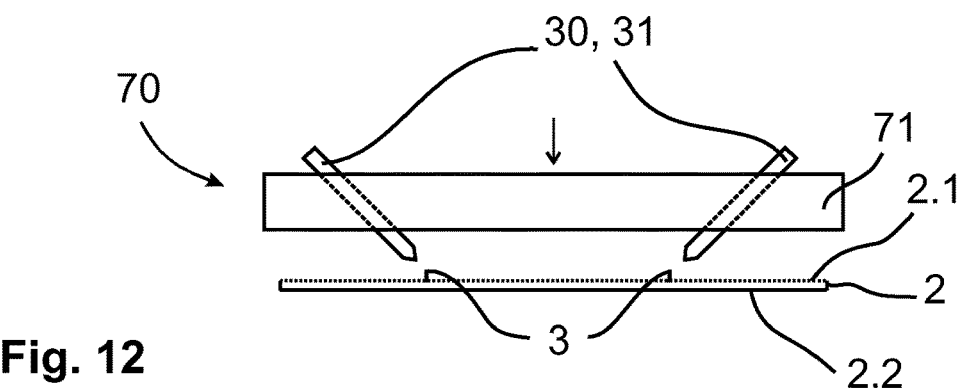
Figure 13:
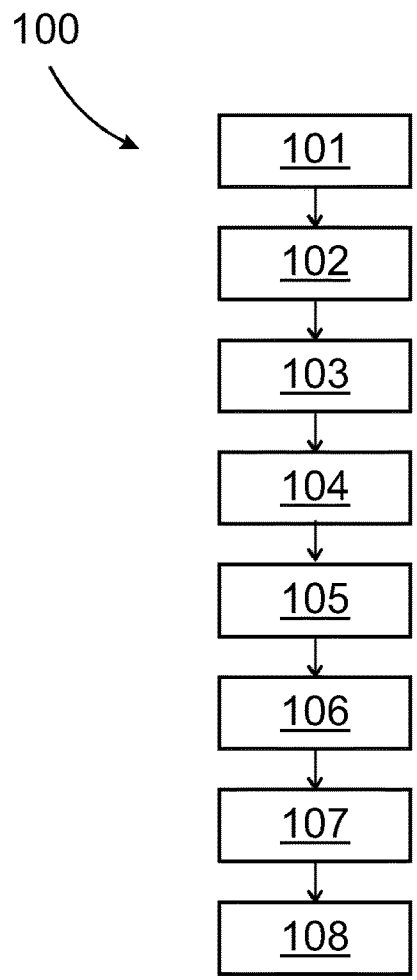
Figure 14A:
Figure 14B:
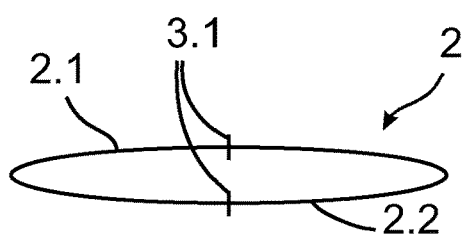
Figure 14C:
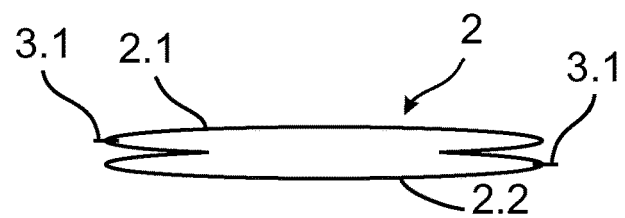

Further advantages, features and details of the invention will be apparent from the following description, in which embodiments of the invention are described in detail with reference to the drawings. In this connection, the features mentioned in the claims and in the description may each be essential to the invention individually or in any combination. Showing:

FIG. 1 a schematic view of a blown film line according to the invention with a system for improved introduction of a separating device into a flattened film tube, FIG. 2 An opening device according to the invention as shown in FIG. 1, wherein the opening elements of the opening device are in a passive position, FIG. 3 an opening device according to FIG. 2, with the opening elements in an active position, FIG. 4 the opening device according to FIG. 2, whereby the separating device is moved into the film tube, FIG. 5 the opening device according to FIG. 2, whereby the separating device is located inside the film tube, FIG. 6 an enlarged view according to FIG. 1, whereby the cutting device has two cutting elements, FIG. 7 in enlarged view of FIG. 1, wherein the cutting device comprises a cutting element, FIG. 8 a further embodiment of a control unit which can be integrated as shown in FIG. 1, FIG. 9 a schematic view of a separating device of a system according to the invention, FIG. 10 a cutting device of a system according to the invention in a further embodiment, FIG. 11 an opening process in an opening device of a system according to the invention in a further embodiment, FIG. 12 an additional separating device of a system according to the invention in a further embodiment, and FIG. 13 a schematic representation of the process according to the invention, FIG. 14a-c pattern of an opening device according to the invention in further embodiments, FIGS. 15-22 a possible embodiment for a retraction process to insert the separating device into the flattened film tube, FIGS. 23-30 a possible embodiment of an extension process to transfer the separating device from the flattened film tube, FIGS. 31-40 a possible embodiment in which an additional cutting device can act on the flattened film tube.

In the following figures, the identical reference signs are used for the same technical features even of different embodiments.

FIG. 1 shows a sketch of a blown film line 1, in which a film tube 2 is extruded by a die head 4 and conveyed away in the conveying direction Z. The material of the film tube 2 is initially still present as a melt-like extrudate. Plastic is first plasticized in the extruder 14. The resulting mass is fed via a connecting line to the blow head 4, with which the film tube 2 is formed from the mass. Further extruders may be associated with the blow head 4, so that multilayer films can be produced. A method 100 according to the invention for producing a film by the blown film line 1 is shown in FIG. 13. In the following description of the blown film line 1, reference is also made to the method 100.

During extrusion 101 of the film tube 2 from the blow head 4, the film tube 2 is initially present as a film tube when leaving the blow head 4, in which there is a slightly increased internal pressure compared to the ambient pressure. Due to the increased internal pressure, the not yet solidified material of the film tube 2 expands. Ultimately, both the diameter of the finished tube film 2 and the thickness of the film material are adjusted in this way.

Subsequently, the not yet solidified film tube 2 passes into the calibration device 15. Here, the diameter of the film tube 2 is limited. Within the calibration device 15, the film tube 2 cools down to a temperature at which subsequent deformation is no longer possible or is only possible with the use of greater forces. The position at which this phase transition occurs is often referred to as the "frost line".

After leaving the calibrating device 15, the tube film 2 passes into a flattening device 5, in which the tube film 2 is almost completely formed into a flattened, double-layered film web which lies substantially in a tube film level 9. In particular, a flattening 103 of the film tube to form a double-layered plastic film, which is connected in particular in edge regions, thus takes place by the flattening device 5. For this purpose, the flattening device 5 has guiding elements 5.1 by means of which a stepwise or continuous reduction of a width 2.3 of the film tube 2 is made possible.

In the present embodiment, the blown film line 1 has a constriction device 13 with squeezing rollers, in particular so-called nip rollers, which prevent larger amounts of air from remaining inside the film tube 2 during its further transport.

The film tube 2 is further conveyed over transport rollers, which are not explicitly shown, in the direction of two winding points 7,8.

Referring to FIG. 1, the blown film line 1 comprises a system 10 for improved introduction of a separating device 40 into the flattened film tube 2. Here, the system 10 comprises a cutting device 20 and an opening device 30. According to FIG. 1 as well as FIG. 6 and FIG. 7, only a first tube side 2.1 of the film tube 2 is cut by the cutting device 20. In particular, the cutting device 20 may be configured according to FIG. 6 and/or FIG. 7. According to FIG. 6 and FIG. 7, the cutting device 20 has cutting elements 21 to effect a severing cut 3 on the film tube 2. FIG. 6 shows two cutting elements 21, whereas FIG. 7 shows only one cutting element 21. According to FIG. 7, the cutting element 21 is movable transversely to the transport direction Z of the film tube 2. According to the embodiments shown, the cutting device 20 comprises a control 22 for moving the at least one cutting element 21. On the one hand, the movement may be transverse to the transport device Z of the film tube 2. On the other hand, the control 22 may be provided to move the cutting device 20 from an activation state to a deactivation state and vice versa. In the activation state, only a first tube side 2.1 of the film tube 2 is cut by the cutting device 20. In particular, this means that a second tube side 2.2 opposite the first tube side 2.1 remains undamaged or is merely scratched. In particular, however, the second tube side 2.2 is not cut through. In the deactivation state, the cutting device 20 has a distance to the film tube 2.

Preferably, an anti-adhesion device 23 for locally changing an adhesion property of an inner side of the film tube 2 may be integrated into the cutting device 20. For this purpose, at least one of the cutting elements 21 of the cutting device 20 may comprise the anti-adhesion device 23, as shown in FIG. 10. When the cutting element 21 for cutting 102 the first tube side 2.1 is at least partially introduced into the film tube 2, an anti-adhesion agent can be introduced, preferably sprayed, into the film tube 2. The anti-adhesion agent may comprise, for example, an oil or a silicone spray.

This may reduce adhesion of the first tube side 2.1 to the second tube side 2.2 when the film tube 2 is flattened 103, so that opening 104 by the opening device 30 may be facilitated, particularly at a later stage in the process.

The constriction device 13 further forms a constriction point 13.1 at which the width 2.3 of the film tube 2 can be reduced. This can be understood to mean, in particular, that a diameter of the film tube 2 is reduced in at least one direction. This can be done, for example, when the film tube 2 is flattened. However, in particular due to an overpressure in the film tube, it may happen that at least a few air particles are entrained and pass the constriction point 13.1. In the course of the production of the film, the entrained air can accumulate in front of a deflection unit 51, in particular in the form of a roller, for deflecting the film tube 2, if the deflection unit 51 is arranged downstream of the constriction point 13.1 in the transport direction of the film tube 2. This can cause an air bubble to form locally at the deflection unit 51. Due to the air bubble, the film tube 2 is stretched and/or pressed against the deflection unit 51, which can lead to a deterioration of quality properties of the film product. In order to avoid or reduce this effect, the cutting device 20 is arranged relative to the constriction point 13.1 and the deflection unit 51 in such a way that air accumulated between the constriction point 13.1 and the deflection unit 51 can be released by the severing cut 3 effected by the cutting element 21. The deflection unit 51 further comprises, in particular for contactless deflection of the film tube 2, an air supply 52. By means of the air supply 52, an air cushion can be formed between the film tube 2 and the deflection unit 51. Due to the resulting contactless deflection, damage to a surface of the film tube 2 can be reduced or avoided. Advantageously, the film tube 2 is thereby guided in such a way that the air cushion is formed between the deflection unit 51 and the closed second tube side 2.2. In this way, it can be avoided that air is blown into the film tube 2 through the air supply 52.

Moreover, an opening device 30 is provided which is arranged downstream of the cutting device 20 in the transport direction Z of the film tube 2. The opening device 30 serves to open the flattened film tube 2 along the cut film tube 2, in order to improve and simplify the introduction of the separating device 40 into the flattened film tube. This is shown schematically in FIG. 2 to FIG. 5. According to FIG. 6, both cutting elements 21 have a fixed distance to each other.

In the illustrated embodiment, the opening device 30 has two opening elements 31, wherein the opening elements 31 can be inserted into a respective severing cut 3 which has previously been created by the cutting device 20. According to FIG. 2 to FIG. 5, the opening elements 31 can be activated by a control 32. Moreover, the separating device 40 comprises separating elements 41 which are movable by means of a control 42. In particular, the separating elements 41 can have guiding elements 43, as shown in FIG. 9. Furthermore, opening elements 31 may have different geometries. For example, the opening elements 31 can be hook-like, which is not explicitly shown. In the illustrated embodiment, the opening elements 31 are of bolt-like configuration. In FIG. 2, the opening elements 31 are located at a distance from the flattened film tube 2. According to FIG. 3, the opening elements 31 are in their active position and are located at least partially inside the film tube 2. During the movement of the opening elements 31 from their passive position according to FIG. 2 into their active position according to FIG. 3, the opening elements 31 each penetrate the severing cut 3 which is present on the upper, first tube side 2.1, as a result of which an opening 104 of the film tube 2 is effected.

In order to enable a guiding of a film tube 2 when a separating device 40 is inserted into an opened severing cut 3 of the film tube 2, a separating element 41 may advantageously comprise guiding elements 43 for guiding the film tube 2. In particular, if the separating element 41 is formed as a knife, it may be advantageous that the film tube 2 is guided so that one end of the severing cut 3 meets the separating element 41 during transport of the film tube 2 and the severing cut 3 can be continued through the separating element 41. The guiding elements 43 may be arranged in a V-shape and oriented opposite to a transport direction of the film tube 2.

The fact that the opening elements 31 are located in the active position at least in regions below the first tube side 2.1 can preferably be detectable by opening sensors 33. For this purpose, the opening elements 31 may each comprise an opening sensor 33 in the form of an optical sensor through which an inner side of the first tube side 2.1 can be detected when the opening element 31 has moved sufficiently far between the first and the second tube sides 2.1, 2.2.

A possible opening process for opening 104 the flattened film tube 2 is also shown schematically in FIG. 11. In this case, an opening element 31 of the opening device 30 penetrates through the severed section 3 and presses against the second tube side 2.2. In this case, there is an adhesive effect of the first and second tube sides 2.1, 2.2 and there is a retaining force H which can result, for example, from an electrostatic attraction. Due to the retaining force H, the first tube side 2.1 initially remains adhered to the second tube side 2.2 even when the first tube side 2.1 is stretched by the opening element 31. Further stretching of the second tube side 2.2 increases a stretching force D of the second tube side 2.2, at least until the stretching force D exceeds the retaining force H. When the stretching force D exceeds the retaining force H, the first tube side 2.1 separates from the second tube side 2.2 at least in some regions at the severing cut, allowing the opening element 31 to pass between the first and second tube sides 2.1, 2.2. This may result from the fact that the film tube 2 is pre-tensioned in the transport direction of the film tube 2, i.e. the two tube sides 2.1, 2.2 are under tension stress. Therefore, the first and second tube sides 2.1, 2.2 each have a tendency to return to the tube film level 9 from a stretched state.

Subsequently, a movement of the separating elements 41 of the separating device 40 in the direction of the opening elements 31 takes place via a control 42 in order to enable a separation 105 of the film tube 2 into two separate film webs 6. Through the opened film tube 2, the separating device 40 with its separating elements 41 can be inserted into the film tube 1. In FIG. 5, the inserted state of the separating device 40 within the film tube 2 is shown. When the separating device 40 is inside the film tube 2, the film tube 2 flattened is cut on both sides at its folding lines into two film webs 6. One film web 6 is fed to the winding point 7, and the second film web 6 is fed to the winding point 8. At the winding points 7, 8, in particular, a winding 108 onto the film webs 6 takes place to form windings which can be further processed and/or further transported.

As FIG. 5 illustrates, there is then a movement of the opening elements 31 to their passive position. The cutting device 20 also moves to its deactivation state when the separating device 40 is inserted inside the film tube 2 and cuts it on both sides.

For coordinating the slitting device 20 and the opening device 30, the blown film line 1 comprises a control unit 11.

Preferably, the control unit 11 can be associated with at least one of the winding points 7, 8 in order to enable a winder-controlled operation of the blown film line 1. In particular, the control unit 11 comprises an activation module 11.1 by means of which the cutting device 20 can be controlled in dependence on a activation of the blown film line 1 in order to introduce the severing cut 3, in particular once, into the first tube side 2.1 during the activation of the blown film line 1. Additionally or alternatively, the control unit 11 may comprise a winder module 11.2 for detecting a change of winding at at least one of the winding points 7, 8. This allows the control unit 11 to initiate the severing cut 3 by the cutting device 20 when the winding change has been detected. In particular, at least one severing cut 3 can be generated at each winding change. Furthermore, the control unit 11 preferably comprises a record module 11.3 for generating a digital or analog winding record. By means of the winding protocol, it can also be traced during further processing of a winding at which position in the winding the severing cut 3 is located. This can enable the film webs 6 to be wound up without the winding being interrupted when a tube section in which the severing cut 3 is inserted reaches the winding points 7, 8.

In order that during the production and transport of the film tube 2, the film tube 2 has the required web tension from the flat laying device 5 to the opening device 30, a control unit 50 is provided which may have one or more deflection units 51 in the form of rollers. Also a positioning in the last third of the film tube with respect to the transport direction Z can be arranged the cutting device 20.

Referring to FIG. 8, it is shown that the control unit 11 may be in communication with one or all of the controls 22, 32, 42. In addition, a sensor unit 12 as shown in FIG. 1 may be provided which can detect, for example, material properties of the film or the cut 3. On the basis of all data, the control unit 11 can control the system 10 accordingly, so that an optimized production of several film webs 6 can be carried out within the blown film line 1.

Referring to FIG. 1, the cutting device 20 may be arranged in the flat laying device 5 or downstream of the flat laying device 5.

Advantageously, the blown film line 1 according to FIG. 1 can further comprise an additional separating unit 70, as shown in FIG. 12. The additional separating unit 70 is arranged in front of the winding points 7, 8, in order to enable a renewed opening of the film tube 2, in particular during the activation of the blown film line 1 and/or during a winding change at at least one of the winding points 7, 8, and to distribute the film webs 6 to the winding points 7, 8. For this purpose, the additional separating unit 70 has a further opening device 30 for further opening 106 of the film tube 2 with opening elements 31 which can be introduced into the severing cut 3 of the film tube 2, in particular extended by the separating device 40, in order to open the film tube 2 and to separate the film webs 6 from one another, at least in regions. Furthermore, the additional severing unit 70 comprises a transverse severing means 71 by which the film tube 2 can be cut completely, i.e. with the first and second tube sides 2.1, 2.2, transversely to the transport direction of the film tube 2. Thus, a separating 107 of a head region of the film tube 2 lying in front of the severing cut 3 in the transport direction of the film tube 2 can take place. The head region can be formed during the activation of the blown film line 1 and, in particular, forms an accumulation of coherent film material. As a result, the film webs 6 are spaced apart from each other after passing the additional separating unit 70 and can be fed in a simple manner by an operator to the winding points 7, 8.

FIGS. 14a to 14c show exemplary advantageous cut patterns which can be introduced into a film tube 2 by the separating device 40 in order to sever the film tube 2. FIG. 14a shows separation cuts 3.1 in two edge regions of the film tube 2, so that the first and second tube sides 2.1, 2.2 are each separated into a film web 6. FIG. 14b shows separation cuts 3.1 in a central region of the film tube 2, so that two individual film webs 6 can be formed from the film tube 2 by unfolding the film tube 2. FIG. 14c further shows a possibility of separating or cutting a film tube 2 folded in sections into two film webs 6.

Advantageously, the blown film line 1 according to FIGS. 1 to 14 can further be operated as follows, which is described in FIGS. 15 to 40. In this case, the system 10, in particular the cutting device 20 as well as the opening device 30 can be operated in a retraction process I according to FIG. 15 to FIG. 22 or in an extension process II according to FIG. 23 to FIG. 30.

Here, the system 10 comprises a contact unit 60 which can be brought or moved between an active position 61 and a passive position 62. In the retraction process I, the separating device 40 with the two separating elements 41 is automatically transferred from a parking position P according to FIG. 15, in which the separating device 40 is spaced apart from the flattened film tube 2, to an operating position B according to FIG. 22. In the operating position B, the separating elements 41 are located at the folding line 16 of the flattened film tube 2 and effect a severing of the film tube 2, so that a separate film web 6 can be fed to each winding point according to FIG. 1 in each case. The above-mentioned retraction process I has the starting position according to FIG. 15. In a first step, according to FIG. 16, a transfer of the cutting device 20 according to FIG. 1 into the activation state 24 takes place, so that two severing cuts 3 are made on the first tube side 2.1 of the film tube 2. According to FIG. 16, the contact unit 60, which can be operated via a control 63, is in a passive position 62, i.e. at a distance from the film tube 2, in particular from the first tube side 2.1.

Subsequently, the opening device 30 is transferred from its passive position 34 to the active position 35 shown in FIG. 17, whereby in the active position 35 the opening elements 31 each protrude into a severing cut 3 of the film tube 2. The opening elements 31 have the effect that the separating device 40 with its separating elements 41 can reliably pass through the resulting opening, formed by the separation cuts 3, into the film tube 2 and be moved. In order that a reliable movement of the separating elements 41 from the parking position P in the direction of the interior of the film tube 2 can take place, the contact unit 60 acts with its two contact elements 65 on the first tube side 2.1 and presses it in the direction of the second tube side 2.2. This creates a necessary distance between the travel path of the separating elements 41 and the film tube 2, or the first tube side 2.1.

Figure 17:
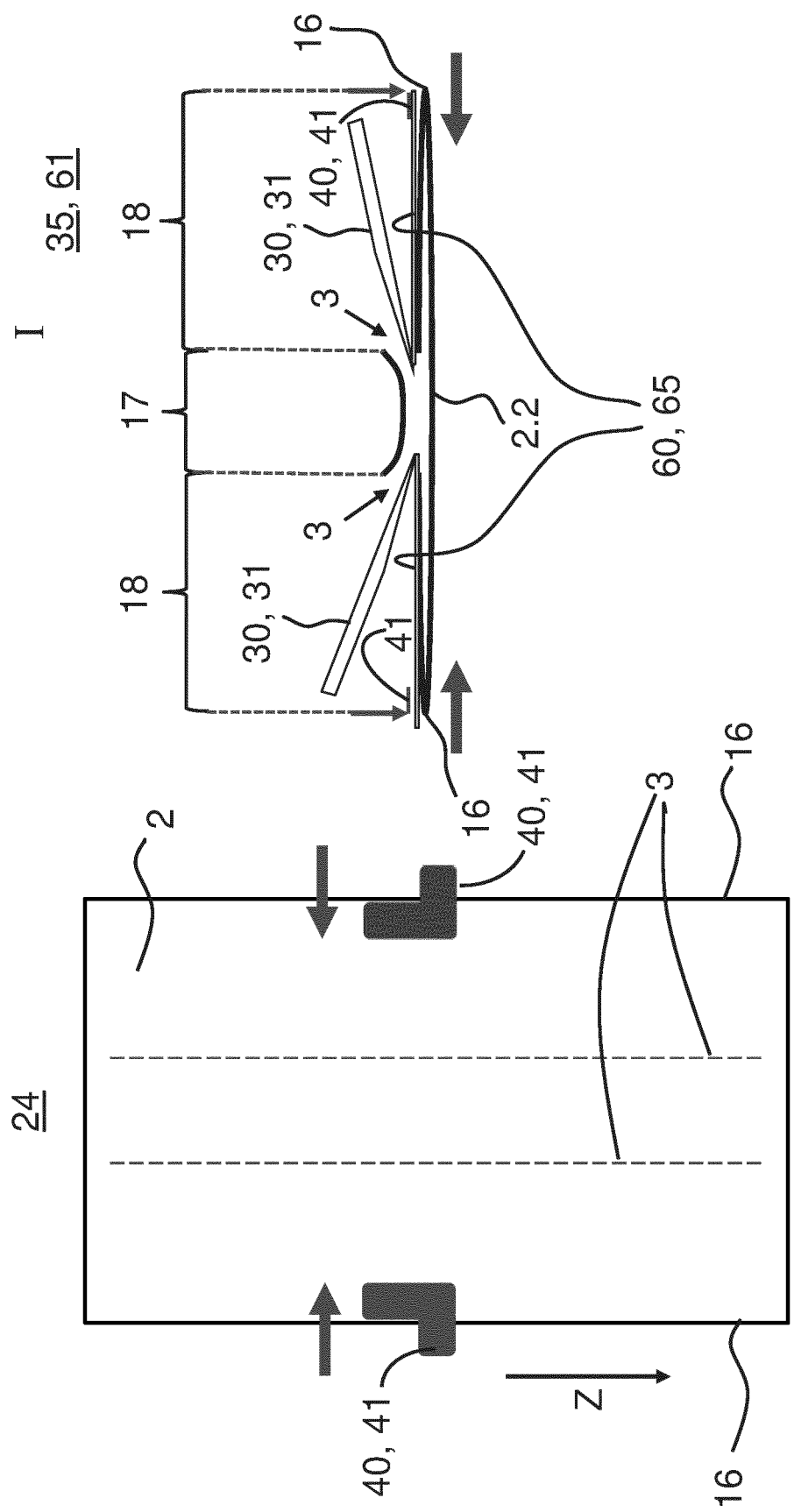

While the cutting device 20 is in the activation state 24, two severing cuts 3 are formed, as shown in FIG. 17 for example, wherein a central region 17 of the film tube 2 is formed between the two severing cuts 3. In addition, two side regions 18 of the film tube are formed, each side region 18 being bounded by a folding line 16 of the film tube and the facing severing cut 3, respectively. By means of the control 63, the contact unit 60 is transferred from its passive position 62 as shown in FIG. 16 to its active position 61, which is shown in FIG. 17 as well as in FIG. 18.

Figure 18:
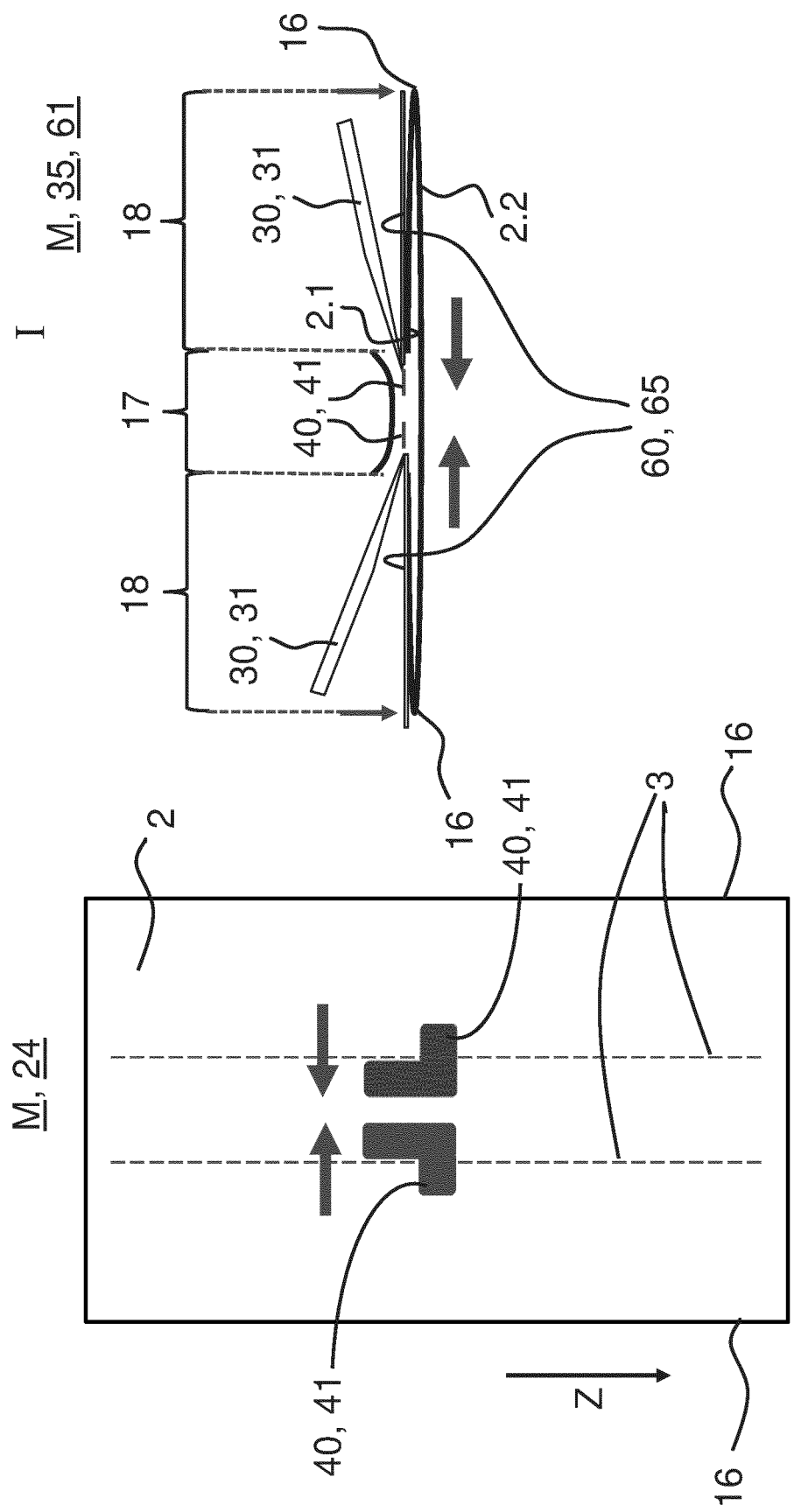
Figure 19:
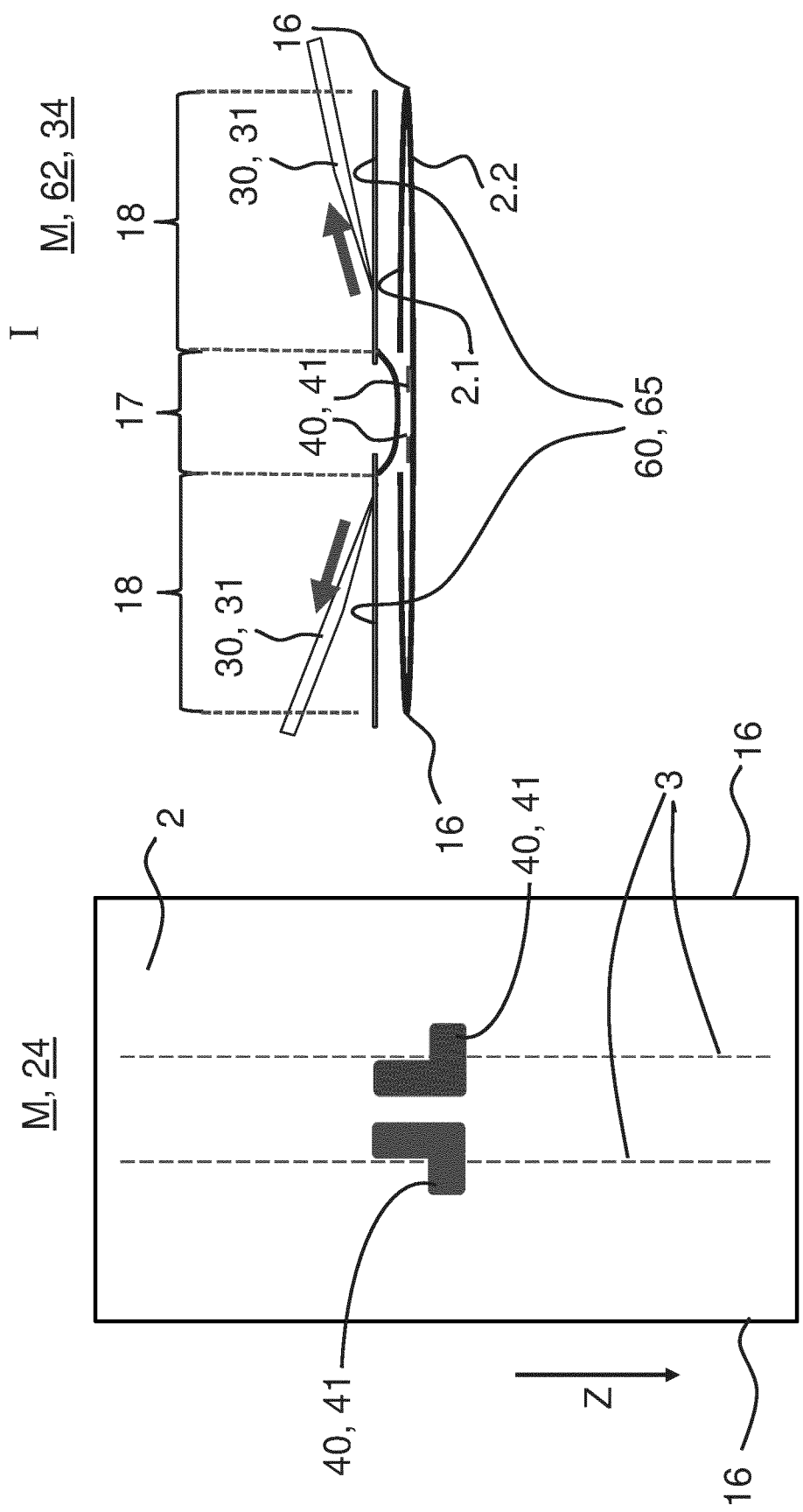
Figure 20:
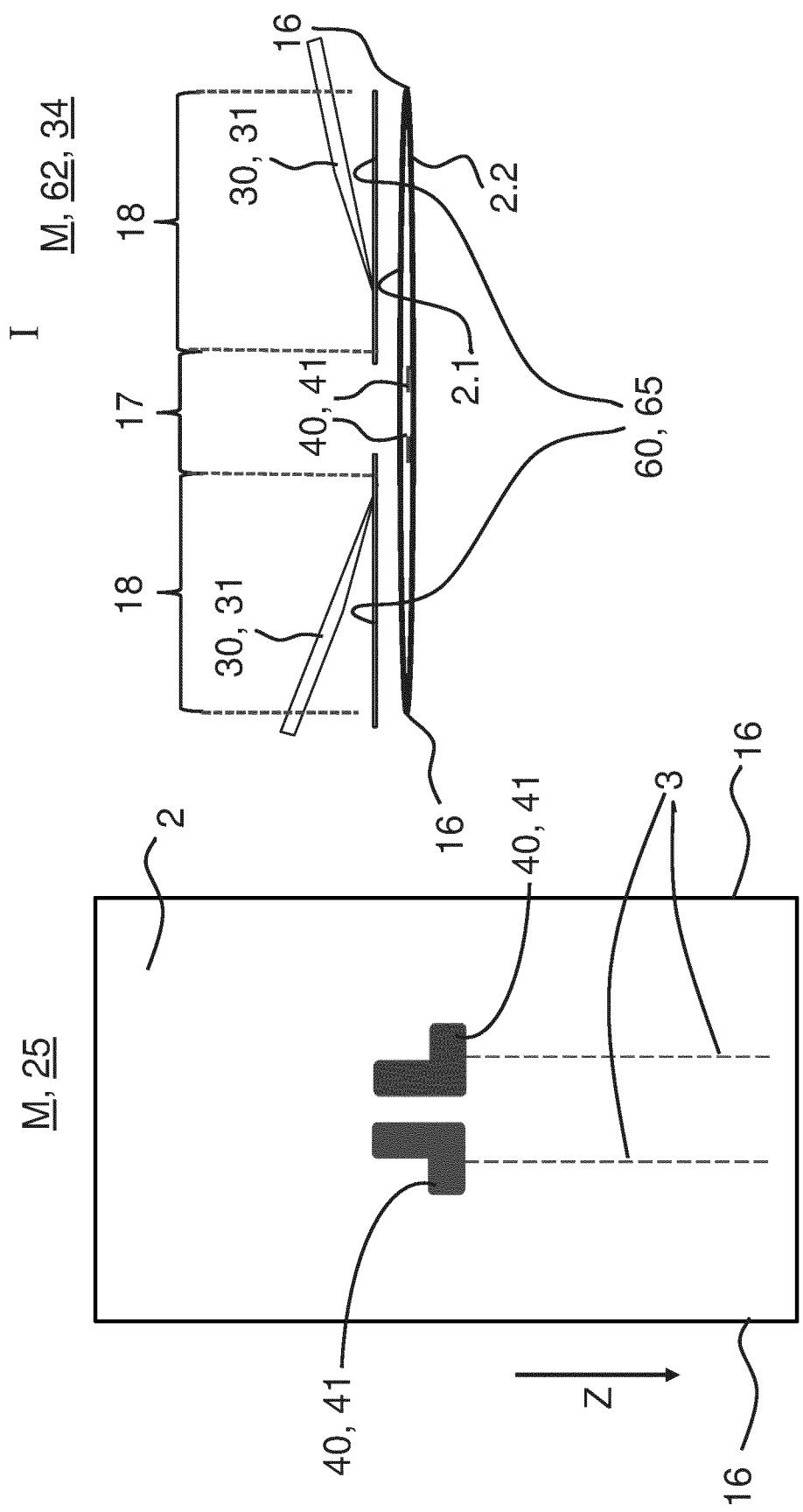
Figure 21:
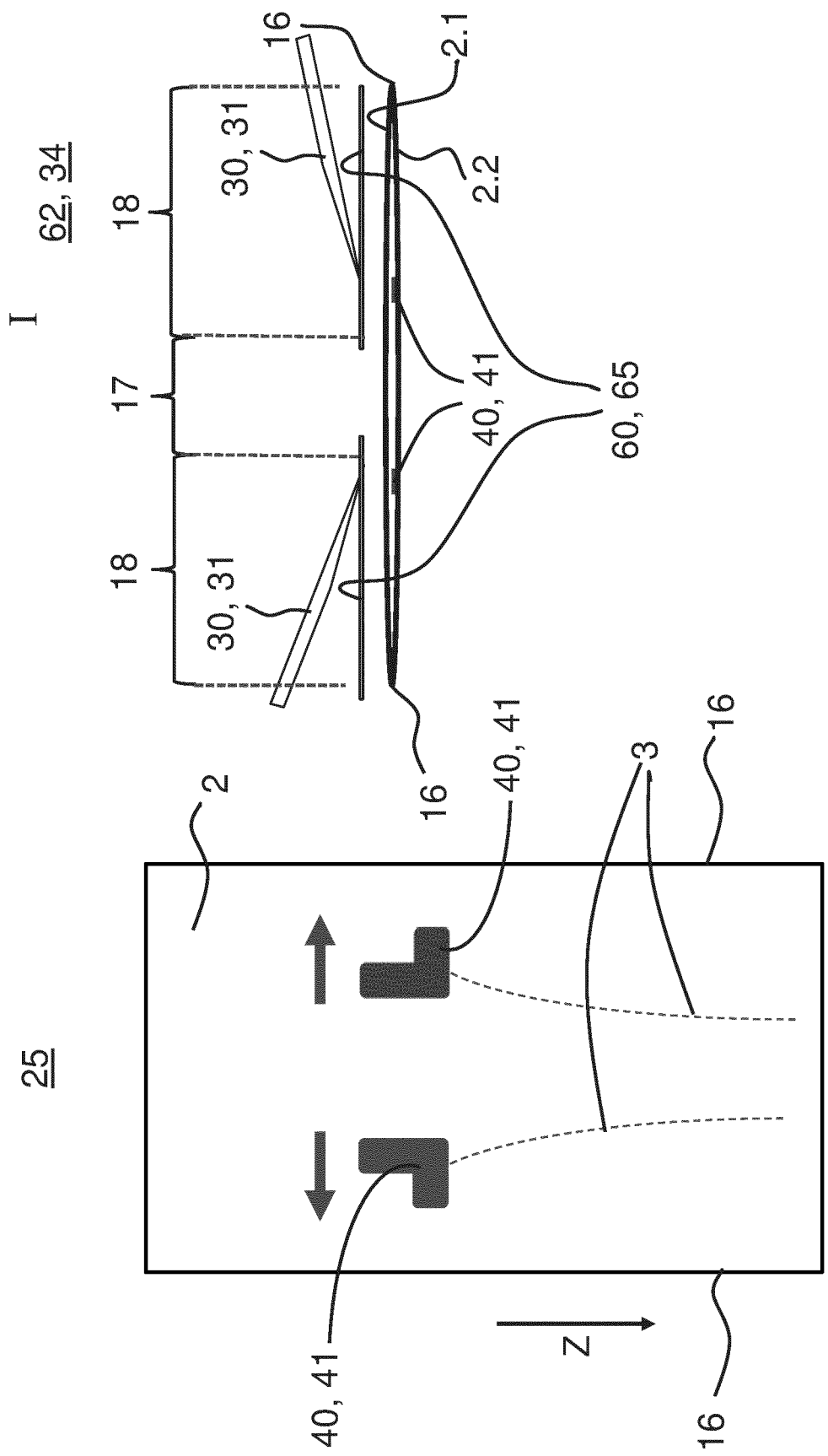
Figure 22:
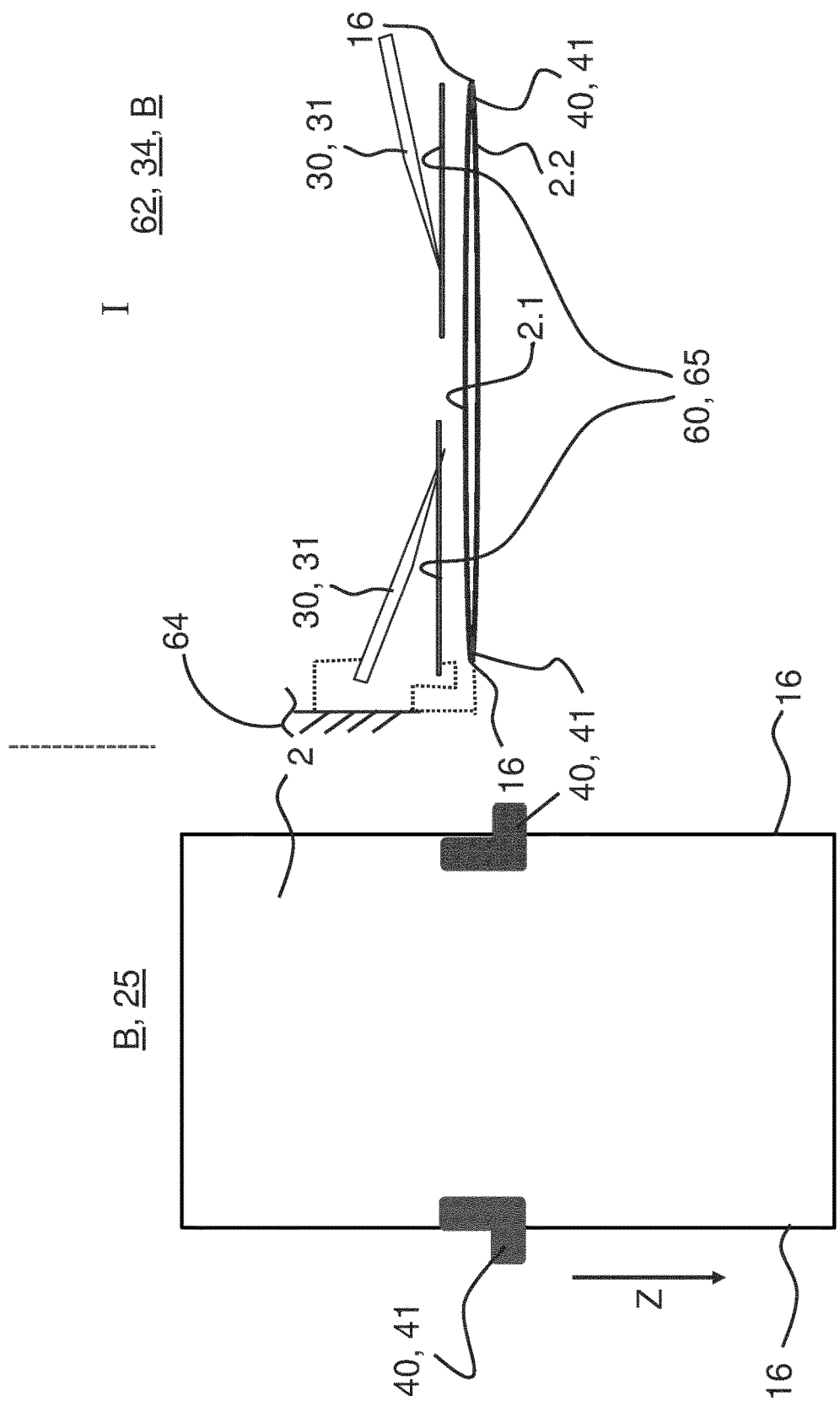

In the subsequent step, the separating device 40 is transferred from its parking position P of FIG. 17 to a central position M of FIG. 18. In the central position M, the separating device 40 is located at least partially in the central region 17 within the film tube 2, the opening device 13 still being located in the active position 35. As shown in FIG. 18, the contact unit 60 acts with one contact element 65 at a time on a side region 18 of the film tube 2. The central region 17 of the film tube 2 remains unaffected by the contact unit 60. After the separating device 40 has reached the central position M, the opening device 30 is first transferred from its active position 35 to the passive position 34, which is shown in FIG. 19. Subsequently, or in parallel, a transfer of the contact unit 60 from its active position 61 to its passive position 62 may take place, which is shown in FIG. 19. In the next step, the cutting device 20 is transferred from its activation state 24 to its deactivation state 25, so that the film tube 2 no longer has any severing cuts 3. Starting from FIG. 20, the separating device 40 can move from its central position M to the operating position B, which is shown in FIG. 21 and FIG. 22. In FIG. 22, the separating device 40 assumes its operating position B, in which it makes a severing cut at the foldinging line 16 in each case, so that a film web 6 is fed to each winding point as shown in FIG. 1.

As indicated in FIG. 22, it is conceivable that the contact unit 60 is arranged and/or supported on a frame 64, wherein the frame 64 can also act as a fastening means for the separating device 40 and/or the opening device 30. For example, it is conceivable that the separating device 40 can be moved to the respective position via a linear track system connected to the frame 64. The opening device 30 as well as the contact unit 60 can be moved to their respective locations or positions via a common control 63. The contact elements 65 of the contact unit 60 may, for example, be formed as elongated bars extending transversely to the transport direction Z. Alternatively, it is also conceivable that a deflection roller, which primarily serves to transport the film tube 2, acts as the contact unit 60, which can be brought into its active or passive position 61, 62 as a function of the retraction process I or extension process II.

Figure 23:
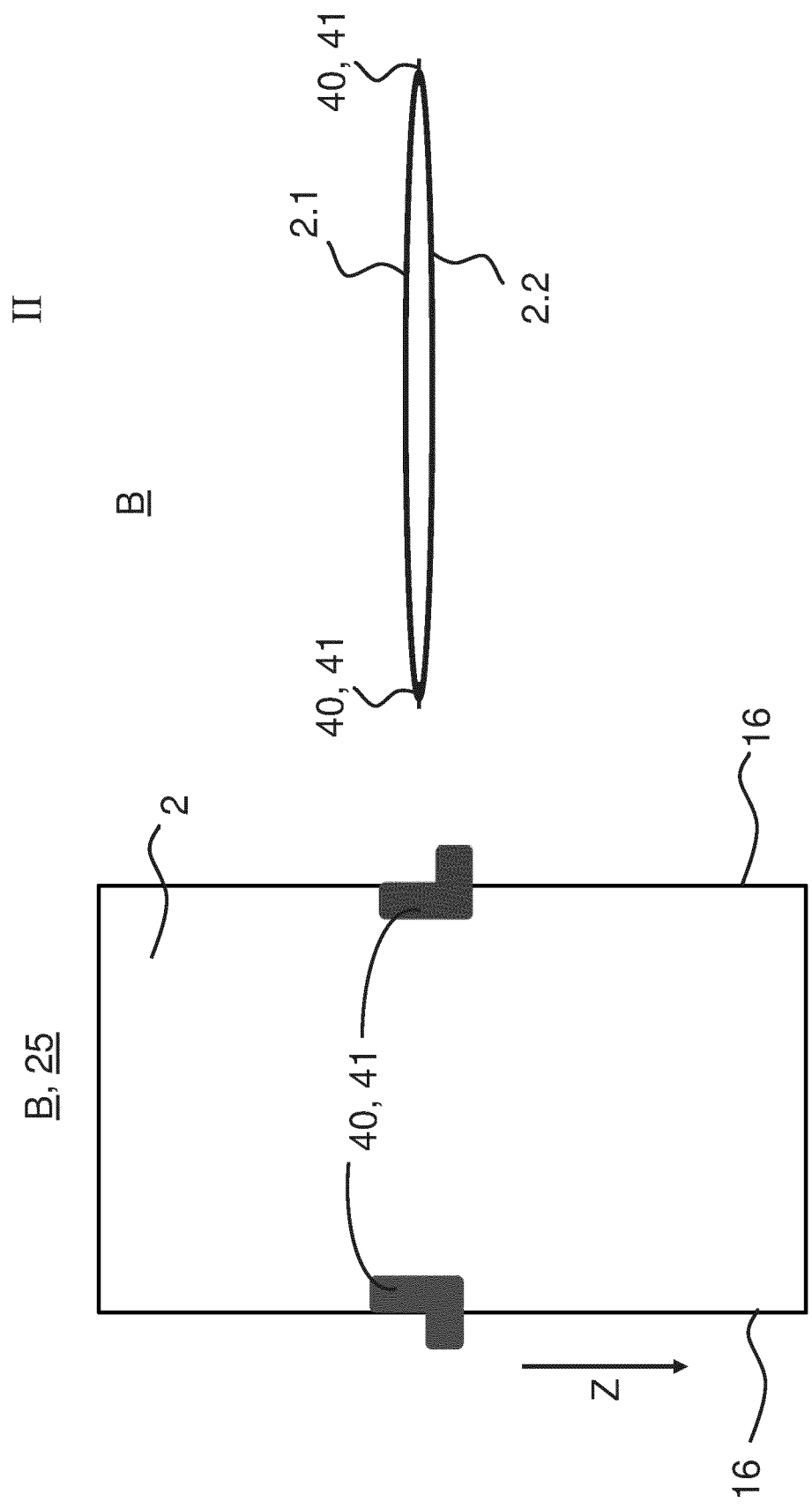
Figure 24:
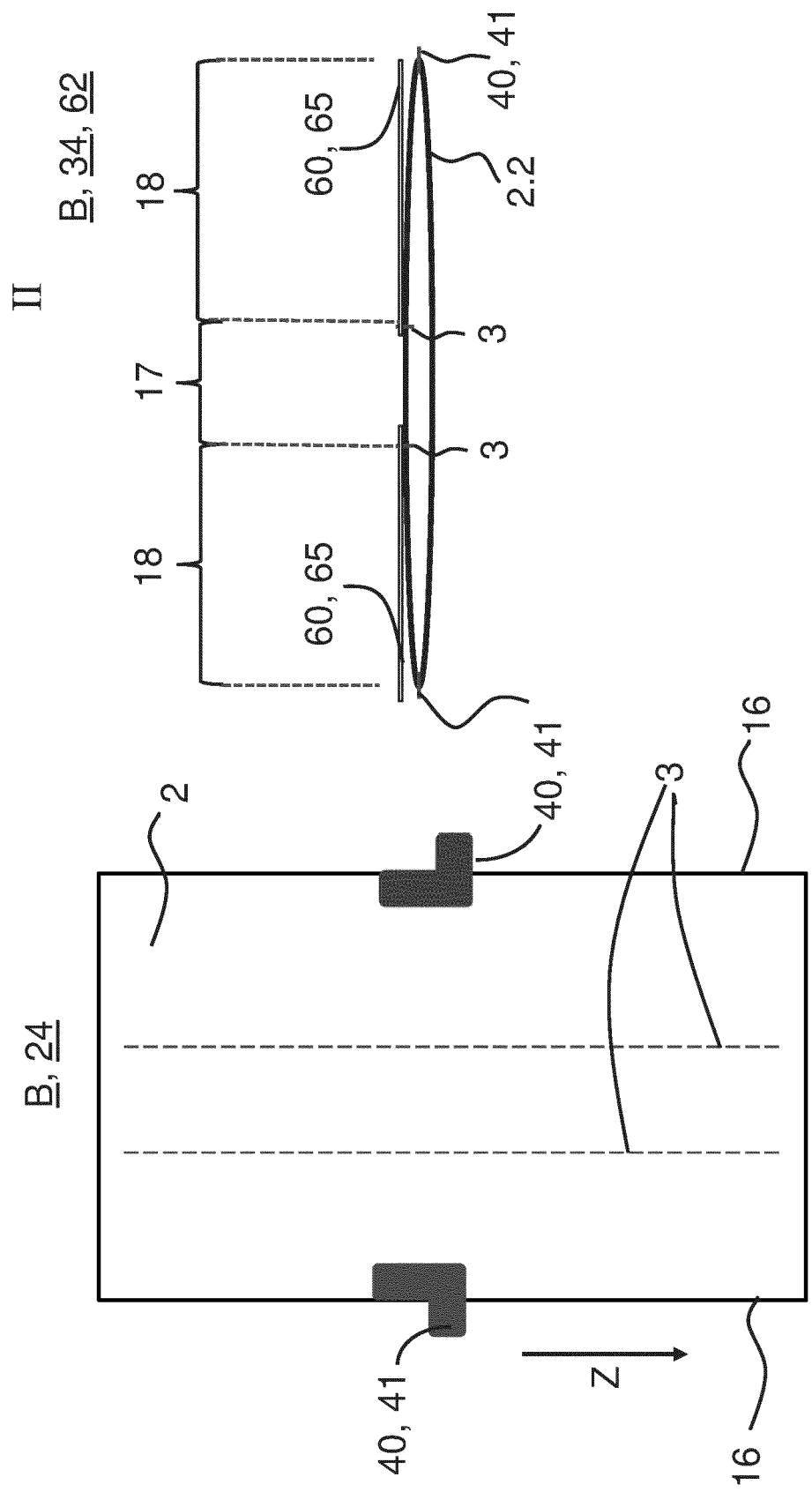
Figure 25:
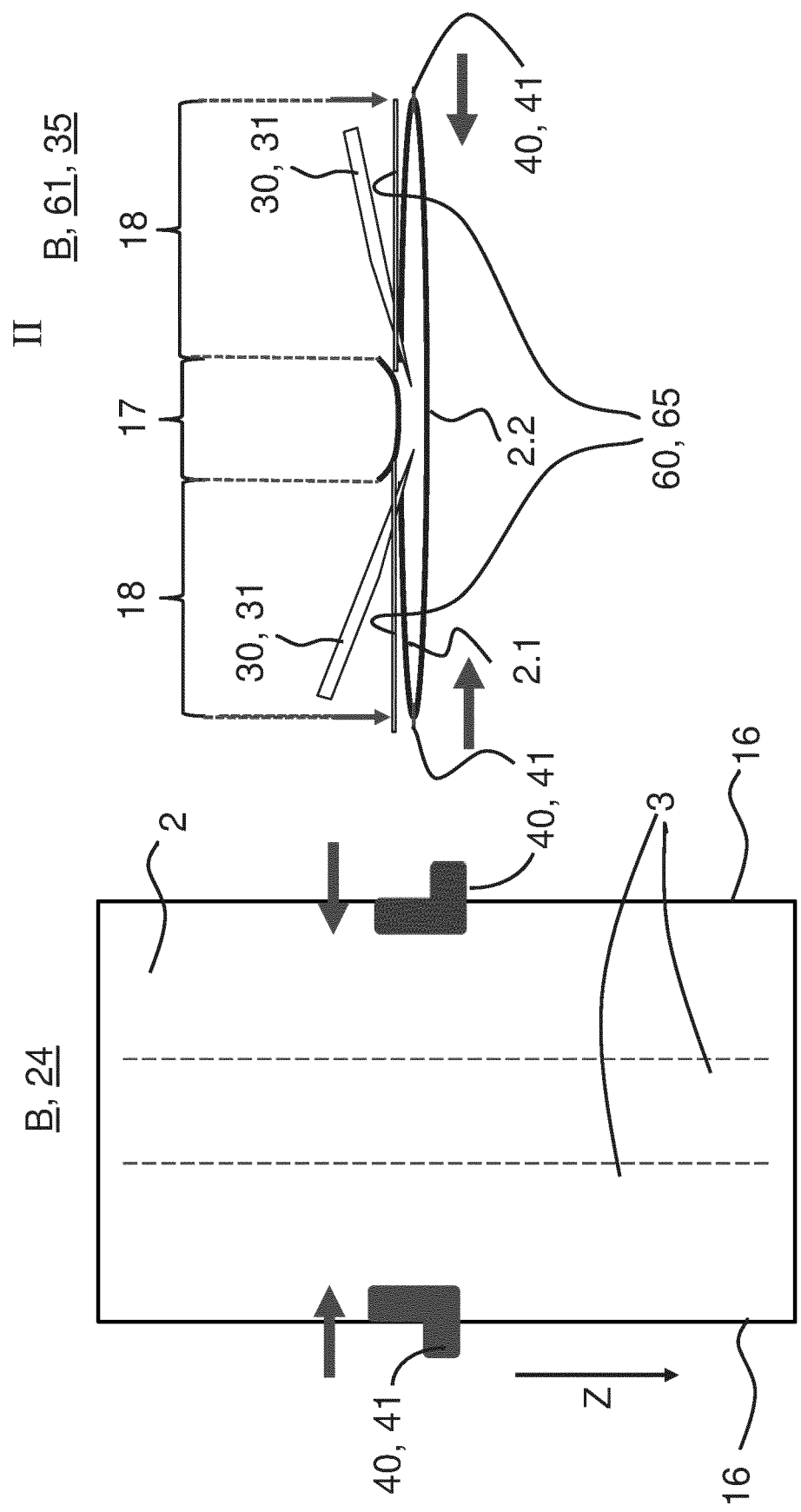
Figure 26:
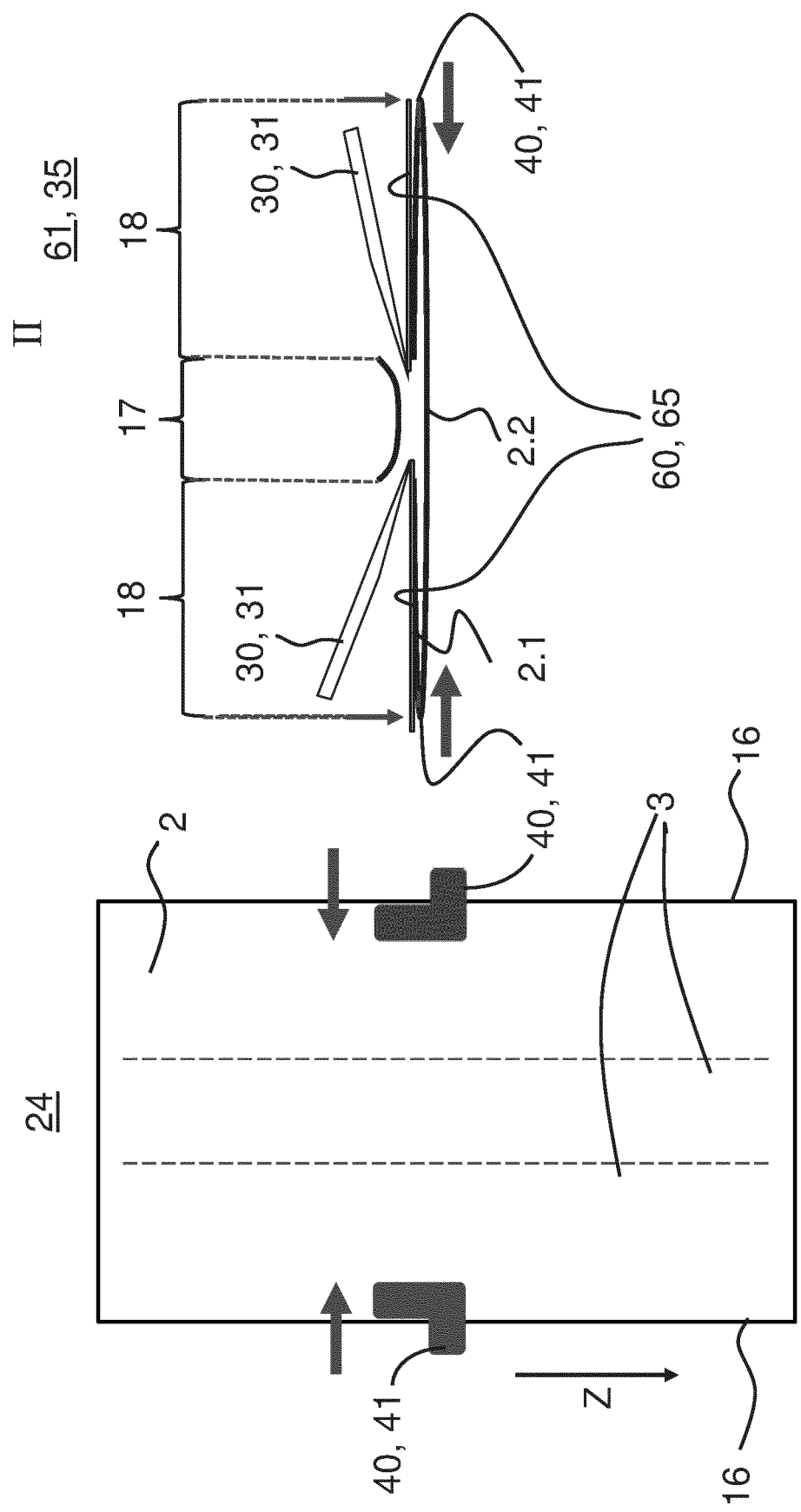
Figure 27:
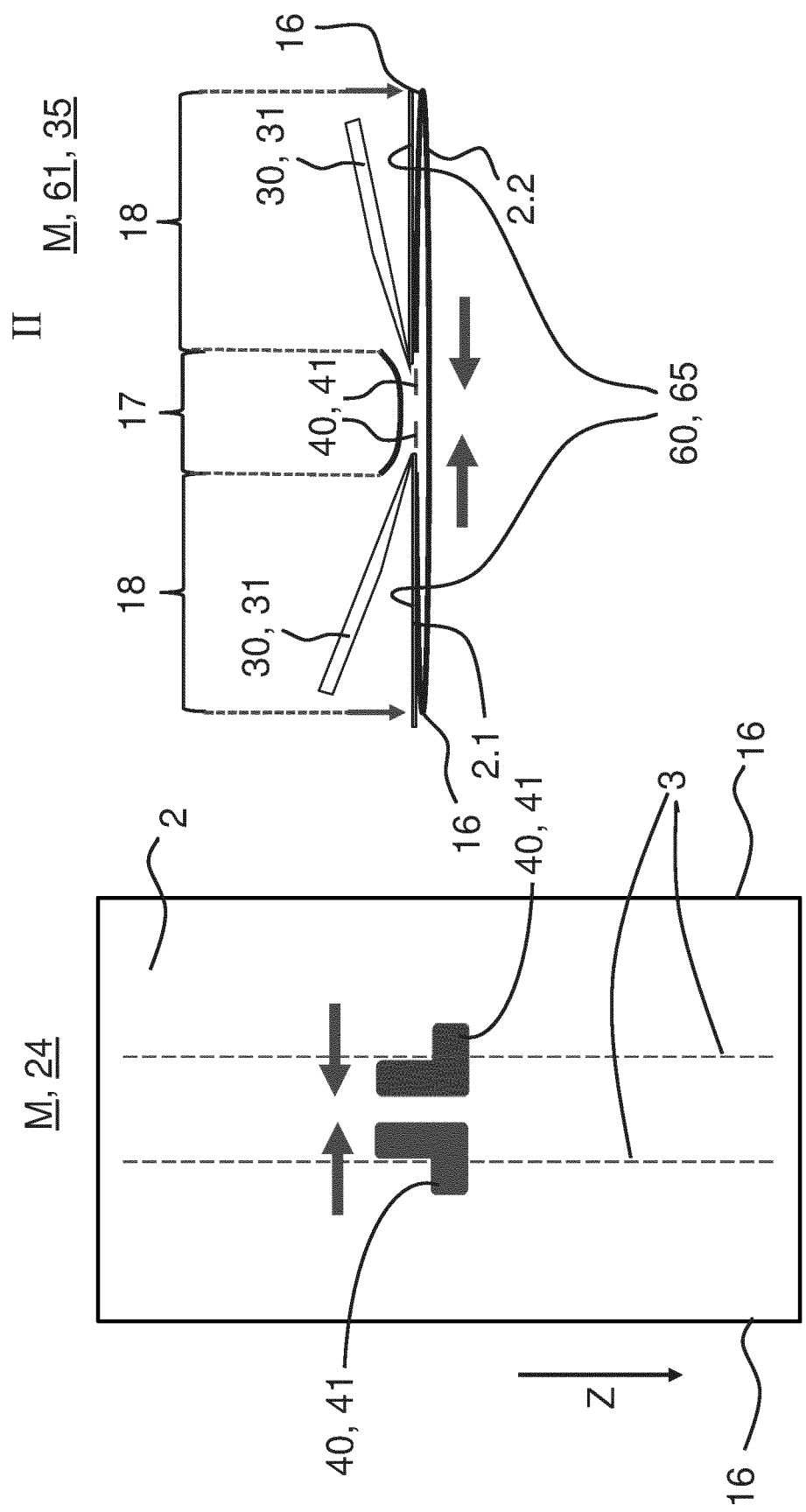
Figure 28:
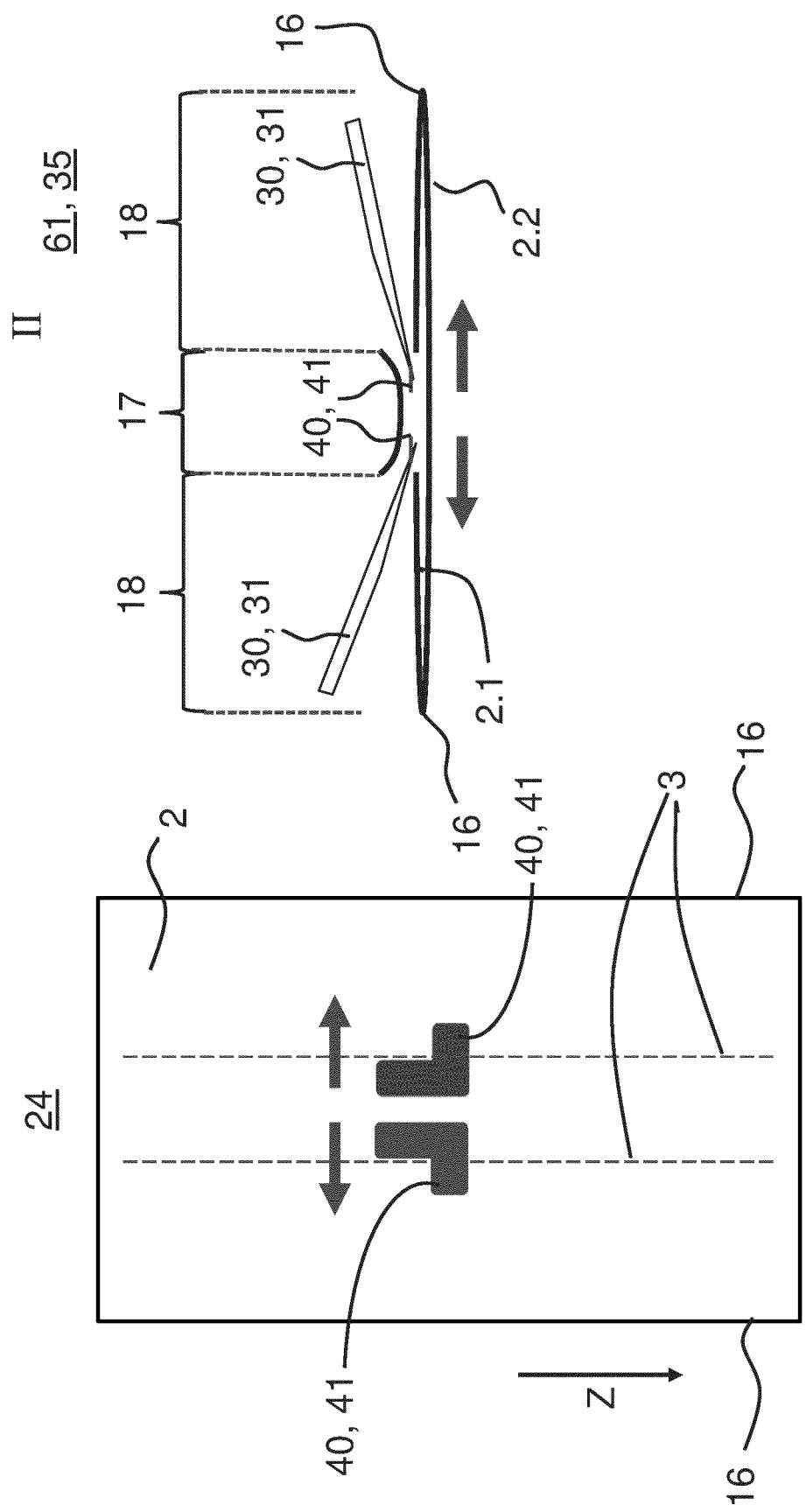
Figure 29:
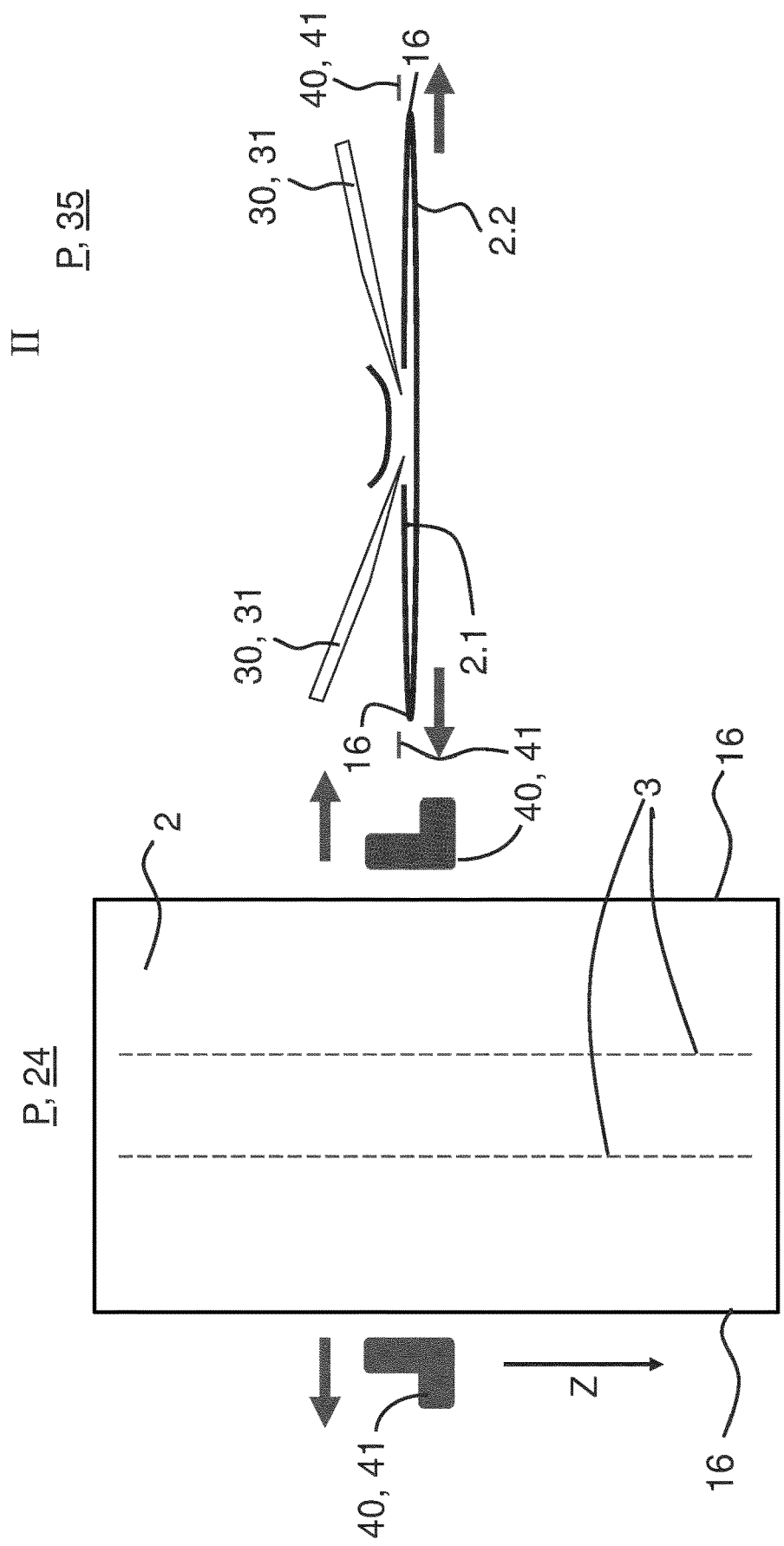
Figure 30:
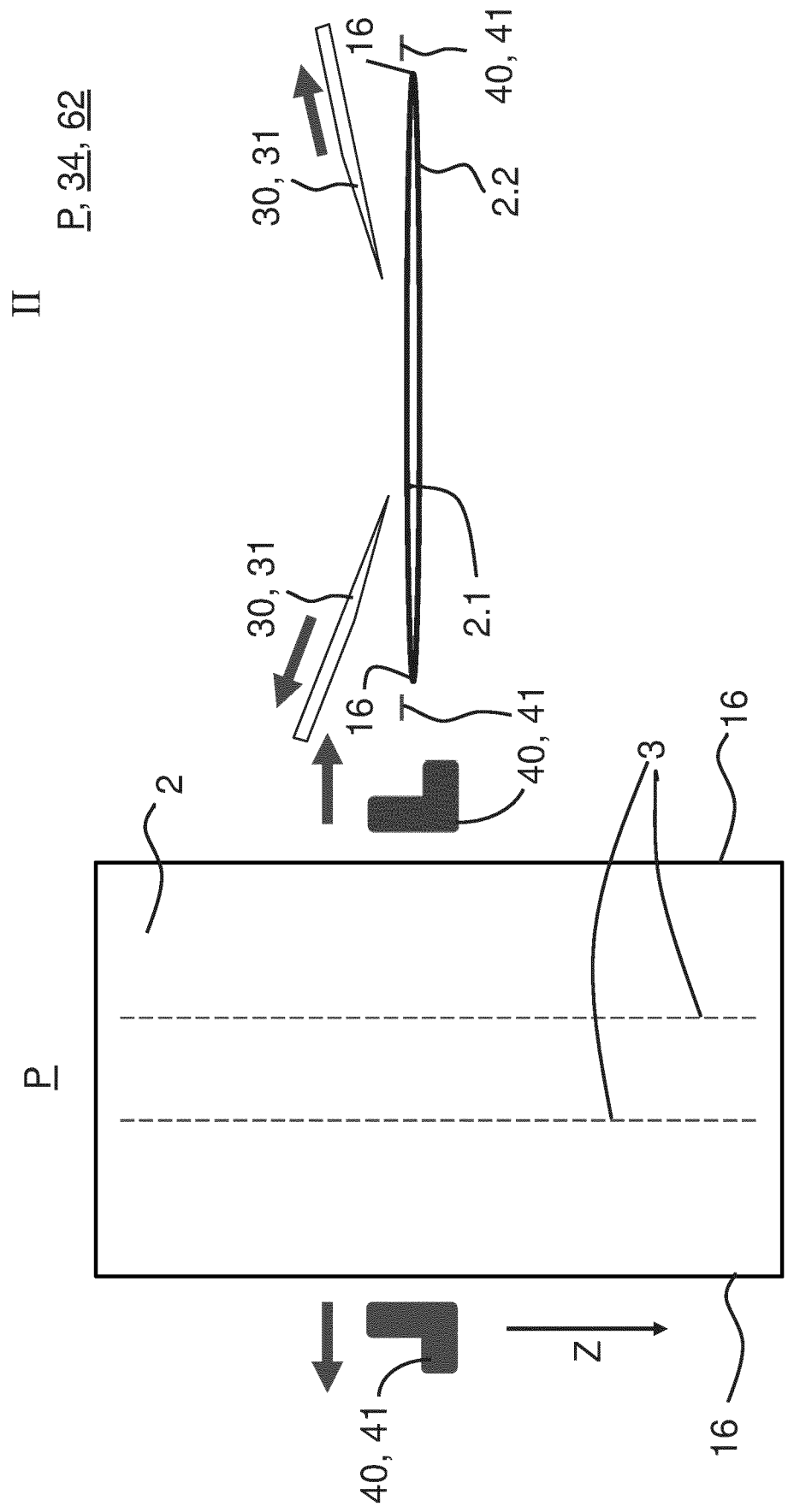
Figure 31:
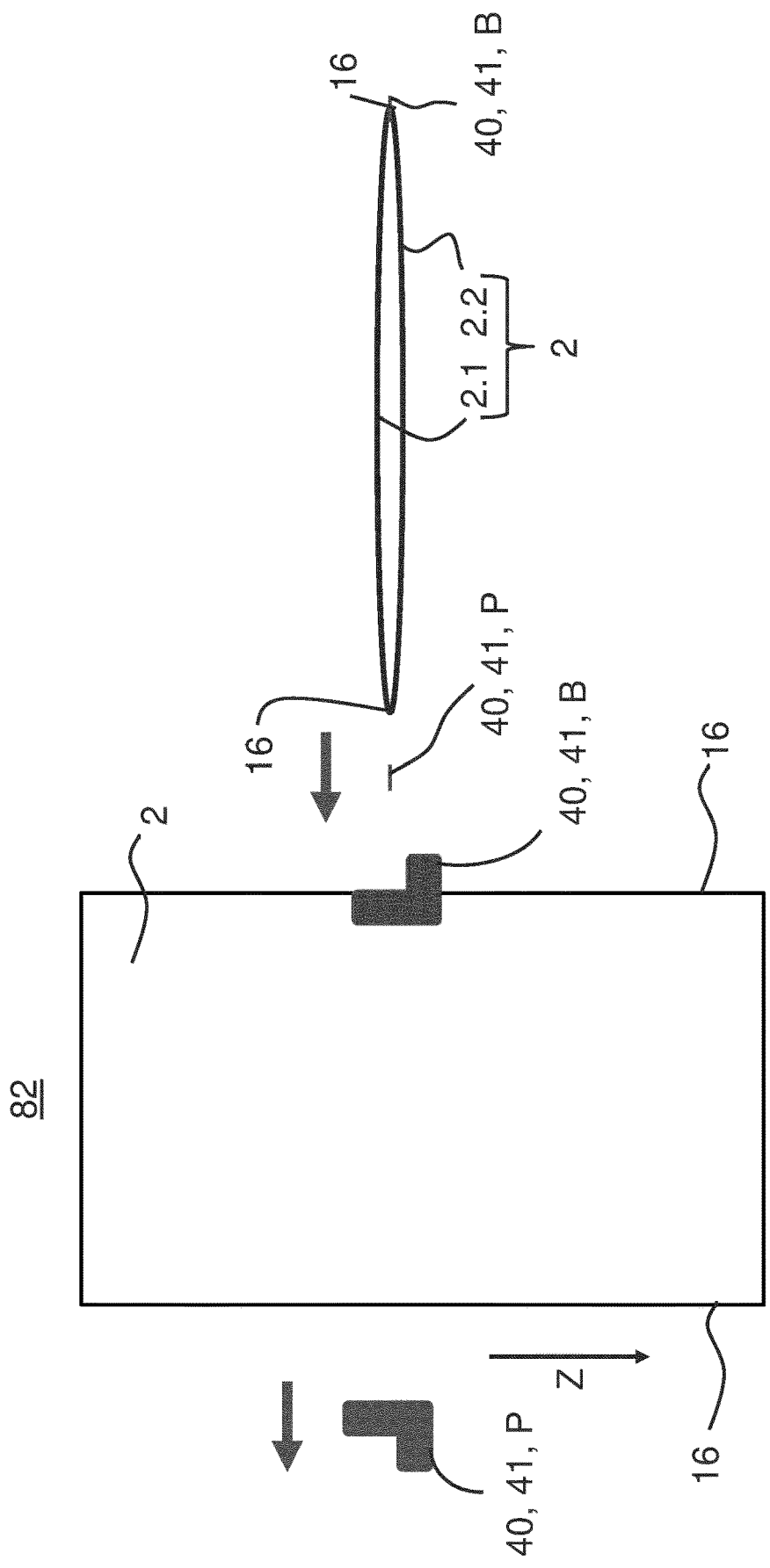

FIGS. 23 to 30 show the extension process II according to the invention, which automatically transfers the separating device 40 from the operating position B shown in FIG. 23 to the parking position P shown in FIG. 30. In the operating position B, the film tube 2 is cut at its two folding lines 16. Starting from FIG. 23, in a first step of the extension process II, the cutting device 20 is first transferred to the activation state 25, so that two severing cuts 3 are made on the first tube side 2.1 of the film tube 2, which is shown in FIG. 24. According to FIG. 25, a transfer of the opening device 30 from the passive position 34 to the active position 35 takes place, whereby the opening elements 31 each protrude into a severing cut 3 of the film tube 2. In addition, a transfer of the contact unit 60 from the passive position 62 to the active position 61 takes place. The movement of the opening device 30 is coupled with the movement of the contact unit 60 in this embodiment, since both elements 30,60 are arranged on a common frame or are at least mechanically in operative connection. According to FIG. 26, the separating elements 41 leave their operating position B and move towards the central position M, which is reached in FIG. 27. According to FIG. 30, the opening device 30 is moved from the active position 35 to the passive position 34, and the contact unit 60 is moved from the active position 61 to the passive position 62. Likewise, the cutting device 20 is transferred from the activation state 24 to the deactivation state 25.

FIG. 31 to FIG. 40 now show an embodiment for counteracting a malfunction during the production of the film webs 6. In special cases it can happen that one of the two separating elements 40, which in particular can be configured as a knife, can fail, in particular move unintentionally from its operating position B into a parking position P. The reason for this can be of different nature. The causes for this can be of a wide variety of nature. For this purpose, a detection means 90 is provided which can effectively detect this failure. In order to avoid a complete production failure, an additional cutting device 80 is provided which is controlled in said failure case to be transferred from a sleep mode 82 to an operating mode 81 by the additional cutting device 80 making an additional cut 83 through both tube sides 2.1, 2.2. of the film tube 2. The additional cutting device 80 is connected to a control 84. The additional cutting device 80 is controlled as a function of the detection means 90, whereby for example a pressure sensor, position sensor, optical sensor can be used to detect the extent to which a malfunction of the type mentioned is present. Likewise, the worker can manually control the additional cutting device 80.

Figure 32:
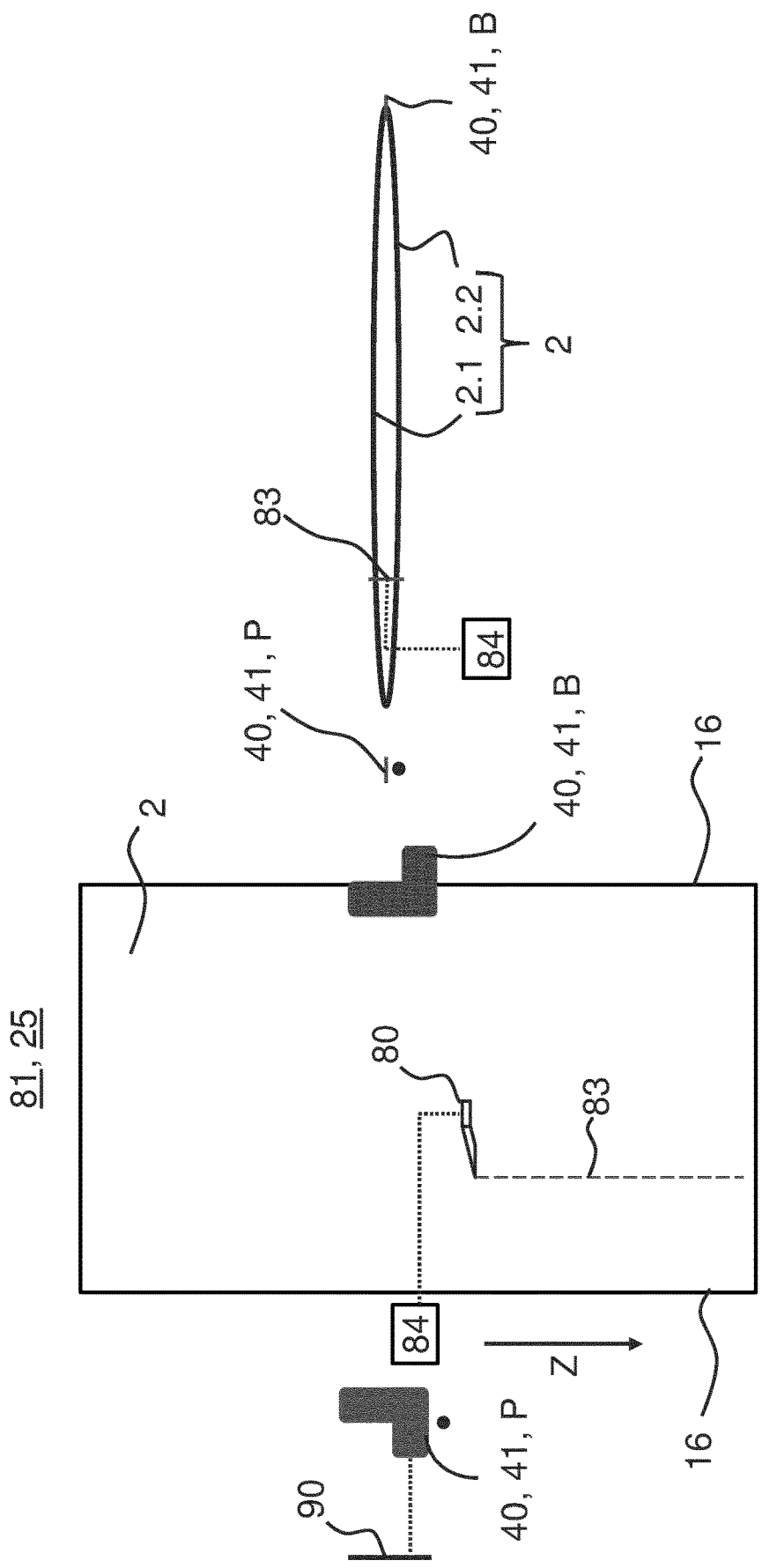
Figure 33:
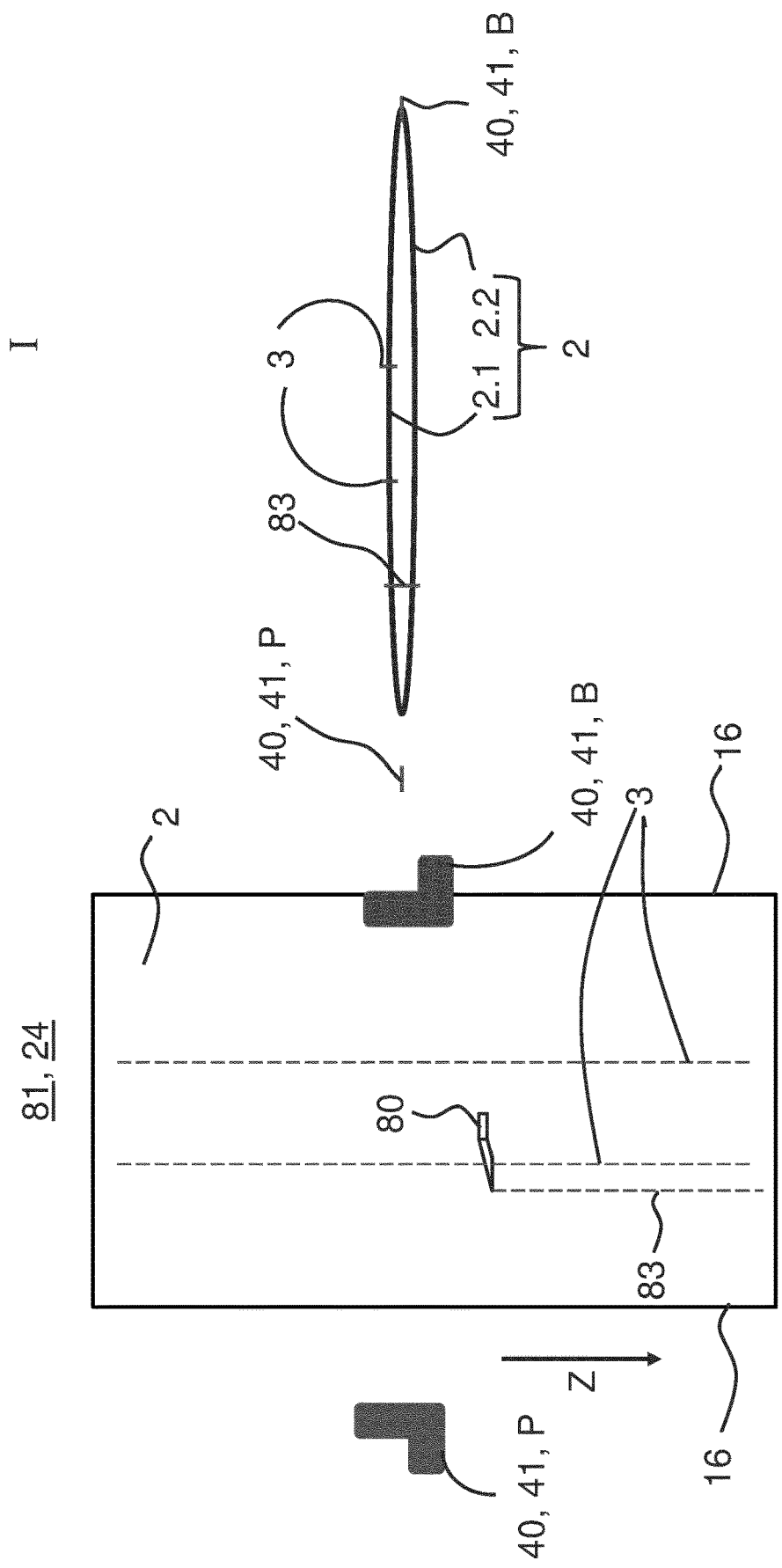
Figure 34:
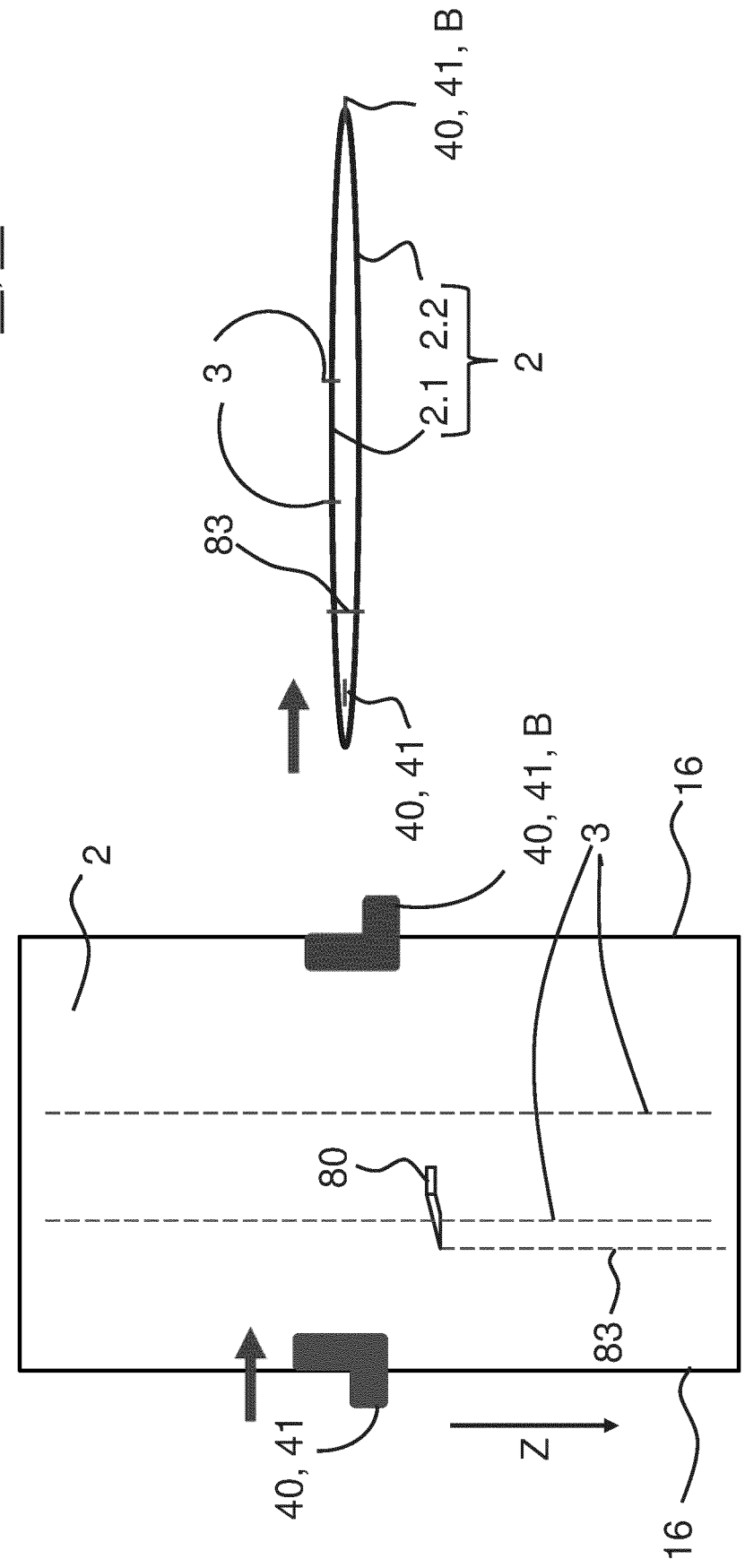

According to FIG. 32, the production can continue, whereby here it does not lead to a loss of flat web, since in this case of malfunction two film webs 6 continue to be fed to the respective winder according to FIG. 1. In FIG. 33, it is shown schematically that the malfunctioning separating element 41 has been replaced by a functioning separating element 41, whereby the retraction process I according to the invention can now be carried out automatically for the separating element 41 on the left in FIG. 33: First, the cutting device 20 is transferred to the activation state 24, so that two severing cuts 3 are made on the first tube side 2.1 of the film tube. Likewise, it is conceivable that only one severing cut 3 takes place, which preferably faces the disrupted separating element 41. This means that also only the left severing cut 3 would be sufficient for the retraction process I.

Subsequently, the opening device 30, which is not explicitly shown, is actuated according to FIGS. 34-40 in order to move it into the active position 35 so that the left separating element 41 can be reliably inserted into the film tube 2. Furthermore, the contact unit 60 not explicitly shown is also provided here, which is brought from its passive position 62 to its active position 61 in order to bring about a reliable movement of the separating element 41 into the central position M according to FIG. 35.

Figure 35:
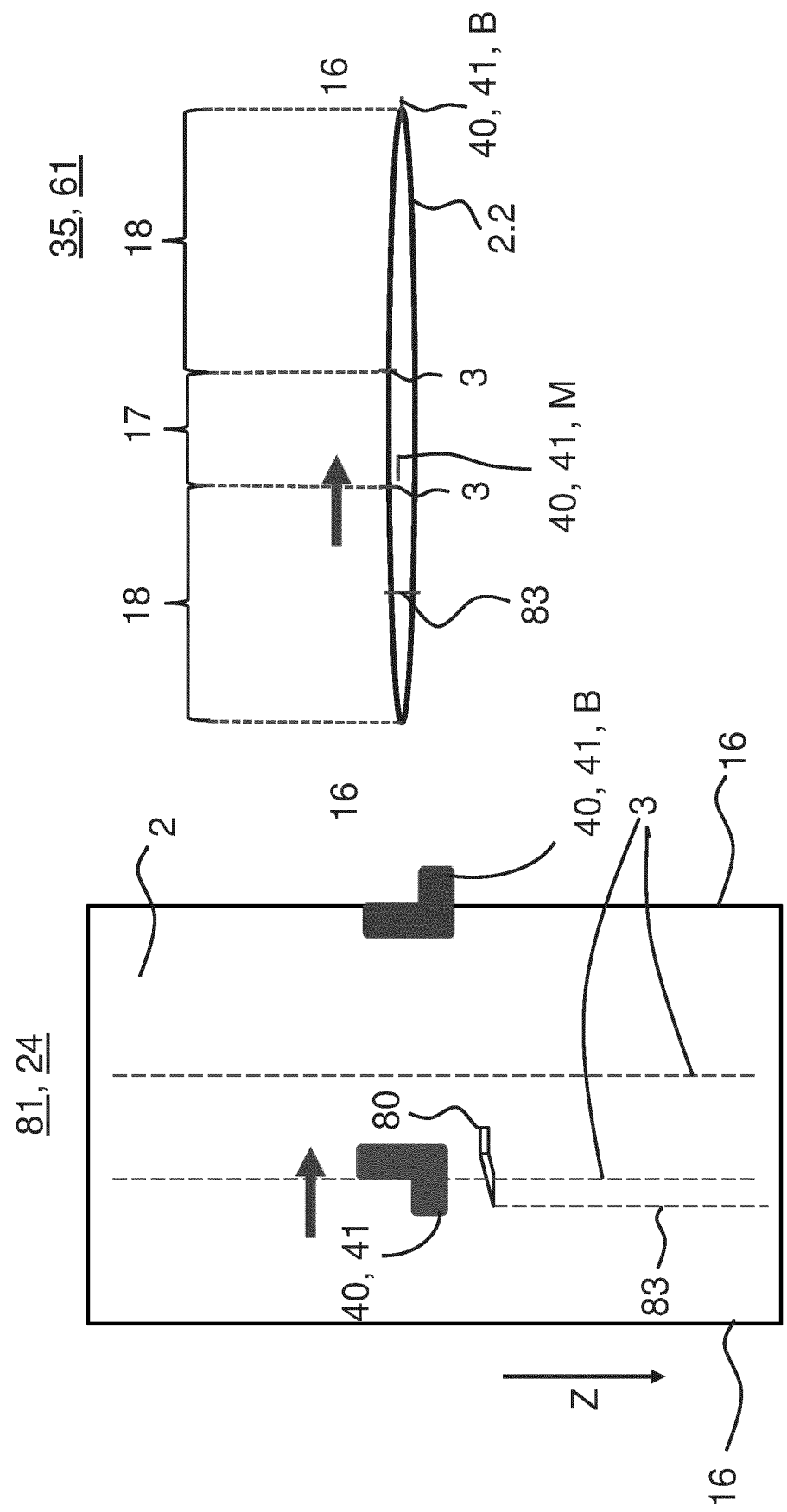
Figure 36:
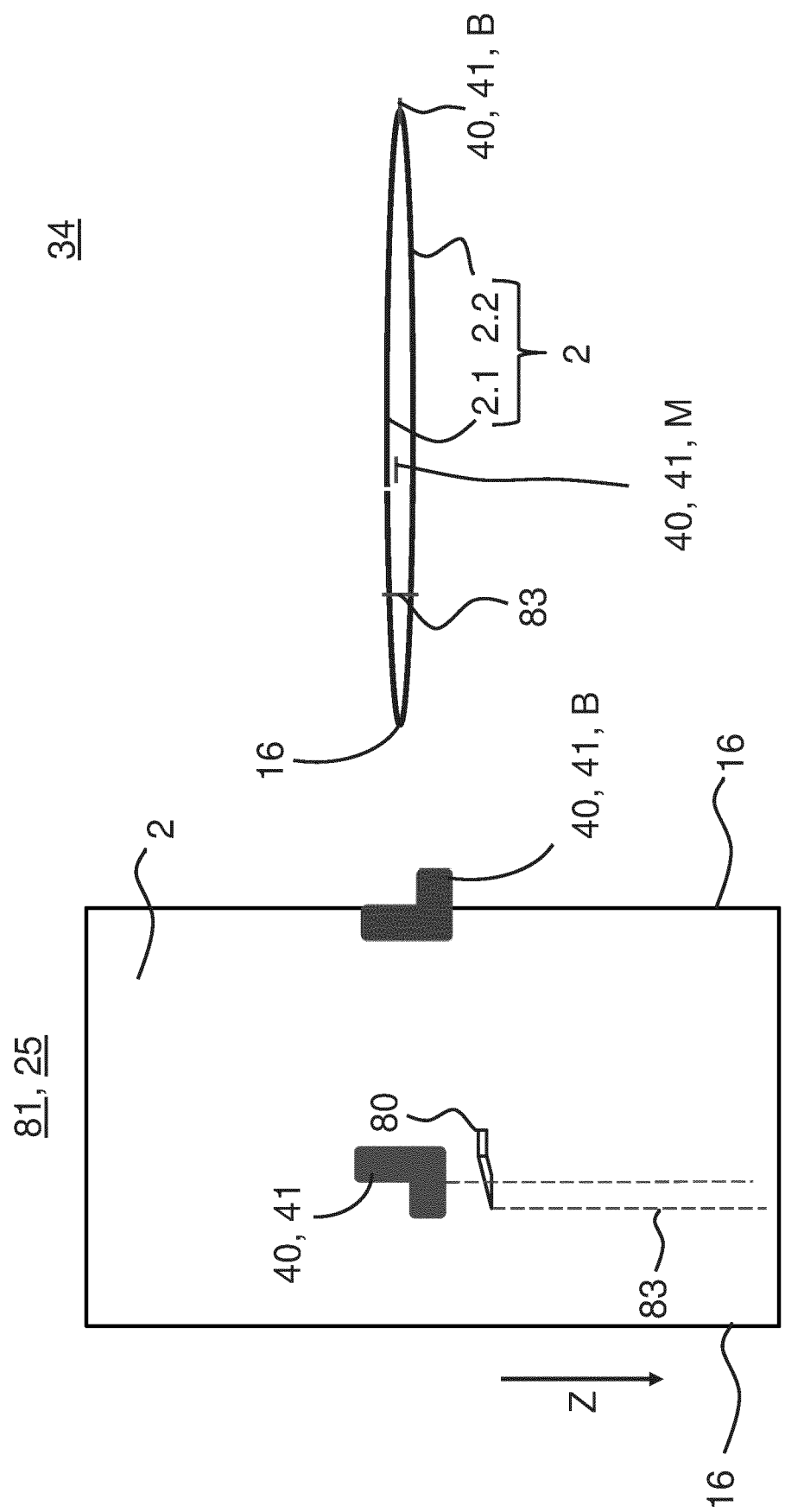
Figure 37:
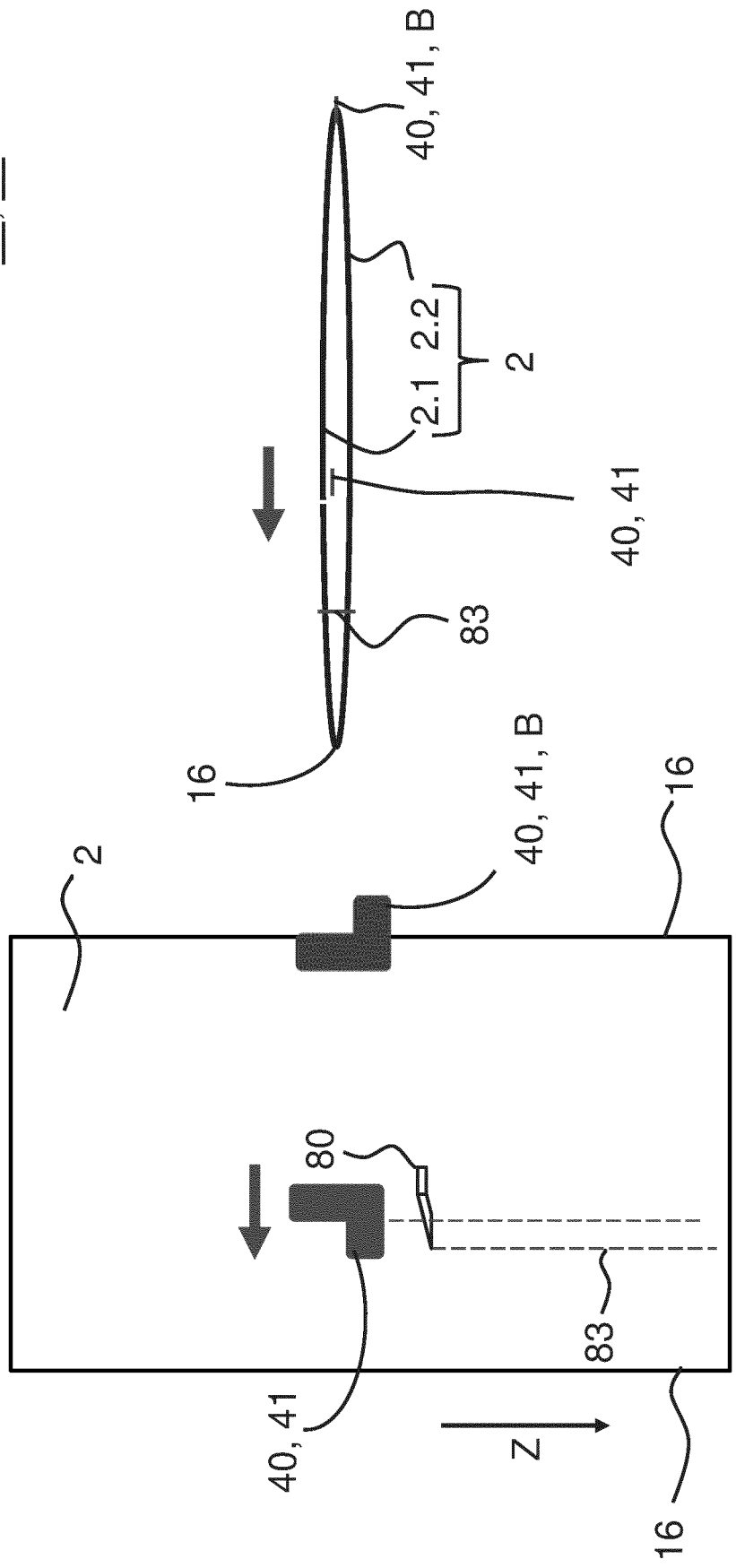
Figure 38:
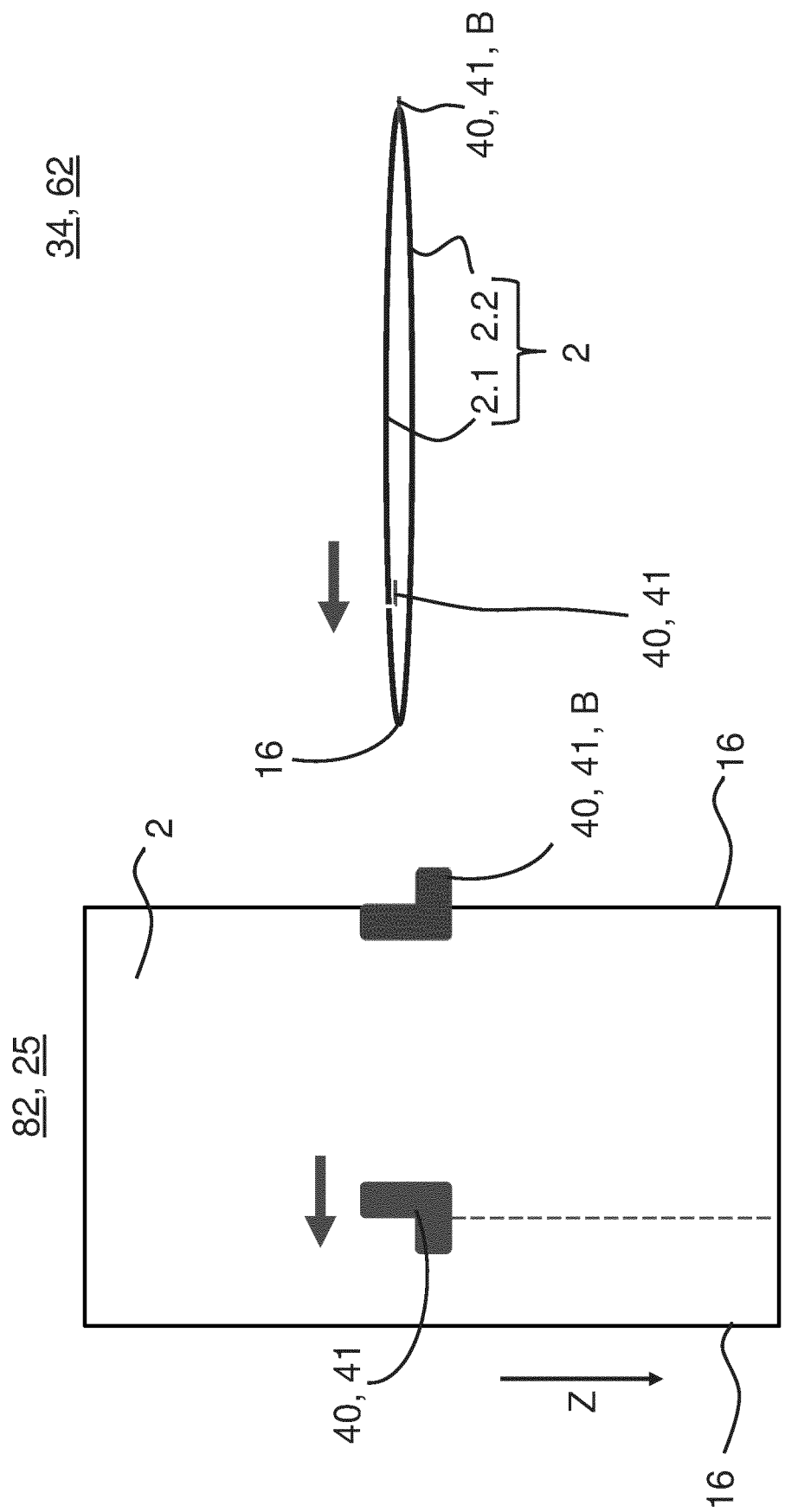
Figure 39:
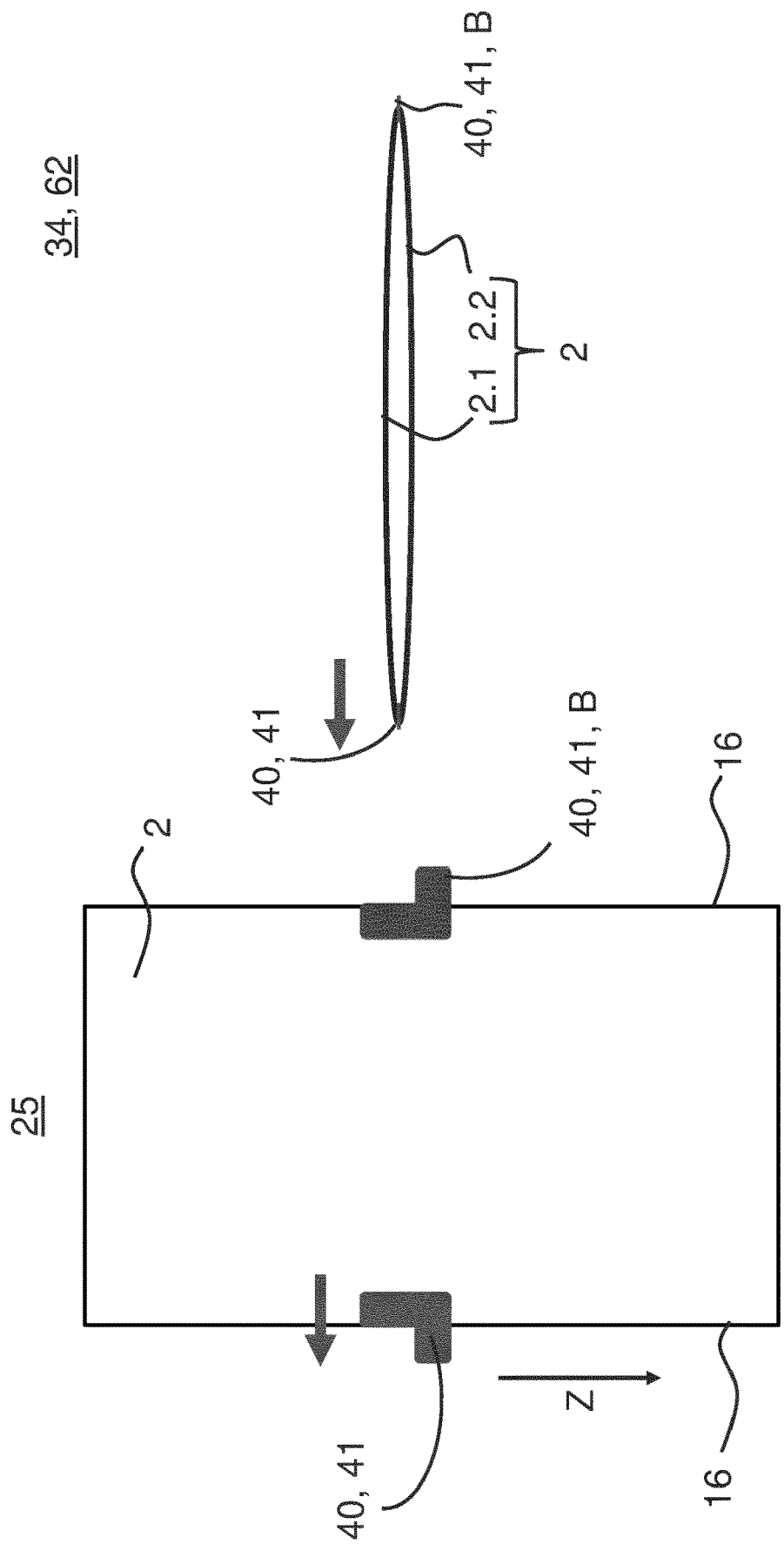
Figure 40:
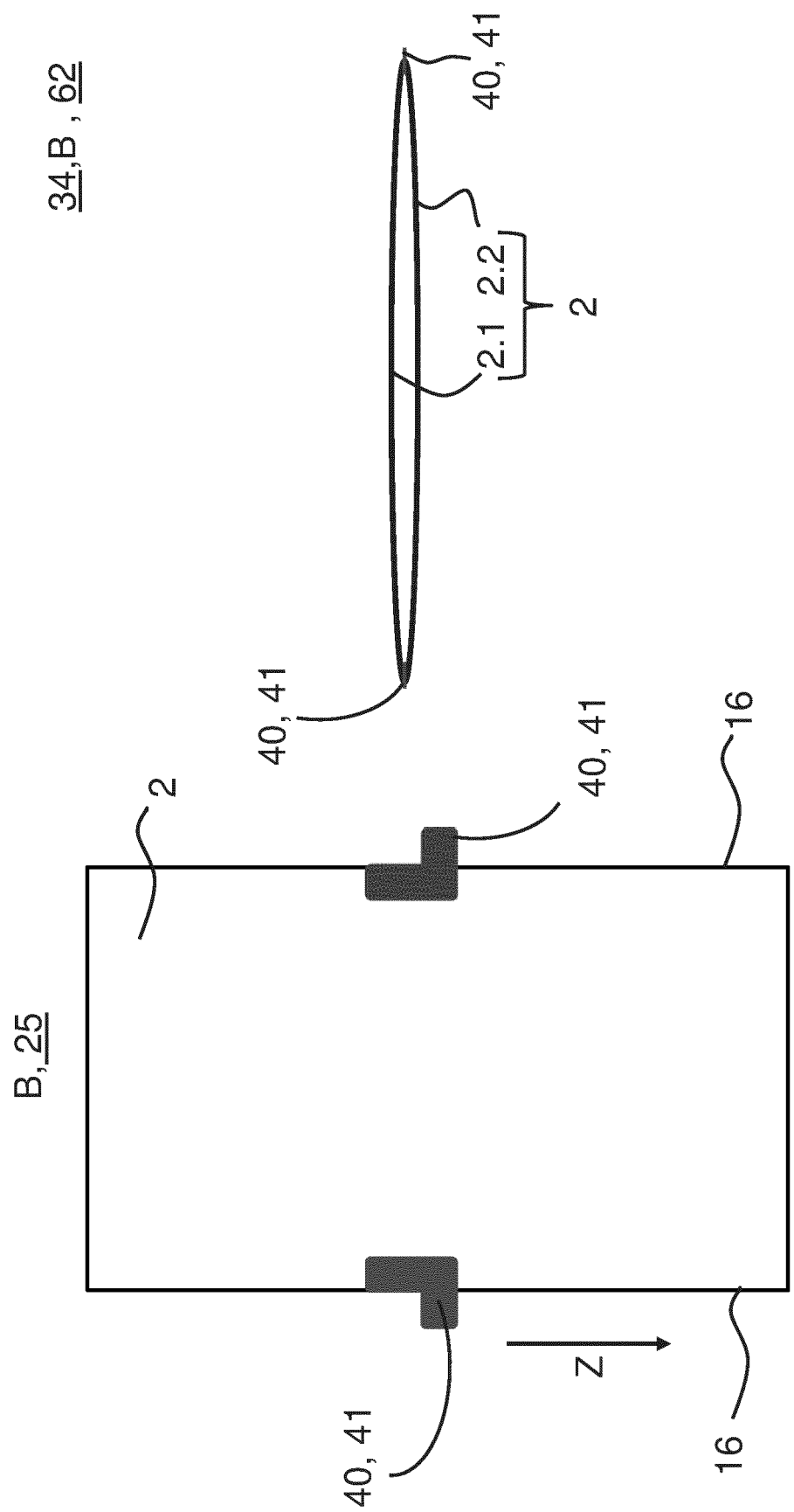

When the separating element 41 is in the central position M, as shown in FIG. 35, the transfer of the cutting device 20 to the deactivation state 25 takes place, so that no more severing cut 3 takes place. Subsequently, it is followed by:

Movement of the separating device 40, in particular of the left cutting element 41 from the central position M towards the operating position B, which is shown in FIGS. 36 to 39. Referring to FIG. 38, the additional cutting device 80 is then moved from its operating mode 81 to its sleep mode 82, so that no more additional cut 83 is introduced into the film tube 2. Finally, in FIG. 40, the separating device 40 with both cutting elements 41 is in its operating mode 81.

The control of the cutting device 20, the opening device 30, the separating device 40, the contact unit 60, the additional cutting device 80 can be effected via separate control units or also via a common control unit 11 as shown in FIG. 8. The detection means 90 can also be signal-technically connected to the control unit 11. The detection means 90 as well as the additional cutting device 80 may also be attached to said frame 64. Alternatively, separate attachment points independent of the frame 64 are conceivable.

According to a further alternative, the contact unit 60 in its active position 61 can act without contact on the flattened film tube 2, in particular on the side region 18 of the film tube 2, both for the described retraction process I and for the extension process II, so that all embodiments are also applicable to this alternative.

The foregoing explanation of the embodiments describes the present invention solely in the context of examples. Of course, individual features of the embodiments can be freely combined with each other, provided that this is technically reasonable, without leaving the scope of the present invention.

LIST OF REFERENCE SIGNS

1 Blown film line
2 Film tube
2.1 First tube side
2.2 Second tube side
2.3 Width of 2
3 Severing cut
3.1 Separation cut
4 Blow head
5 Flattened device
5.1 Guiding elements
6 Film web
7 Winder
8 Winding point
9 Tube film level
10 System
11 Control unit
11.1 Activation module
11.2 Winding module
11.3 Record module
12 Sensor unit
13 Constriction device
13.1 Constriction point
14 Extruder
15 Calibrating device
16 Folding line
17 Central region of the film tube
18 Side region of the film tube
20 Cutting device
21 Cutting elements
22 Control
23 Anti-adhesion device
24 Activation state
25 Deactivation state
30 Opening device
31 Opening element
32 Control
33 Opening sensor
34 Passive position
35 Active position
40 Separating device
41 Separating elements
42 Control
43 Guiding element
50 Control unit
51 Deflection unit, especially a roller
52 Air supply
60 Contact unit
61 Active position
62 Passive position
63 Control
64 Frame
65 Contact elements
70 Additional separation unit
71 Transverse severing means
80 Additional cutting device
81 Operating mode
82 Sleep mode
83 Additional cut
84 Control
90 Detection means
100 Method
101 Extrude
102 Cut
103 Flattening of 2
104 Open from 2
105 Separation of 2
106 Solve from 6
107 Separating head region from 2
108 Winder
B Operating position
D Stretching force
H Retaining force
M Central position
P Parking position
Z Transport direction
I Retraction process
II Extension process

The invention claimed is:

1. A system for improved introduction of a separating device into a flattened film tube of a plant, comprising:
a separating device configured to separate the flattened film tube into two separate film webs;
a cutting device for cutting through only a first tube side of the film tube, wherein the cutting device has at least one cutting element for effecting a severing cut on the film tube; and
an opening device arranged downstream of the cutting device and upstream of the separating device in a transport direction of the film tube for opening the flattened film tube along the severing cut to facilitate inserting the separating device into the flattened film tube,
wherein the opening device includes at least one opening element configured to move from a position outside the flattened film tube to pass through the severing cut.

2. The system according to claim 1,
wherein
at least the at least one cutting element is movable transversely to the transport direction of the film tube, or
the cutting device has a control for moving the at least one cutting element.

3. The system according to claim 1,
wherein
two cutting elements are provided which are at a fixed distance from one another.

4. The system according to claim 1,
wherein
the at least one opening element is of at least hook or bolt configuration.

5. The system according to claim 1,
wherein
at least the opening device comprises an opening sensor, by means of which an introduction of the opening element into the film tube can be detected, or
the opening device is configured to stretch a second tube side, opposite the first tube side, of the film tube in such a way that a stretching force of the second tube side exceeds a retaining force between the first and second tube sides.

6. The system according to claim 1, wherein
an anti-adhesion device for locally changing an adhesion property of an inner side of the film tube is provided.

7. The system according to claim 1, wherein
at least a deflection unit is provided for deflecting the film tube, and
a constriction point is provided, at which a width of the film tube can be reduced, wherein the deflection unit is arranged downstream of the constriction point in the transport direction of the film tube, wherein the cutting device is arranged relative to the constriction point and the deflection unit in such a way that air accumulated between the constriction point and the deflection unit can be released by the severing cut which can be effected in the film tube by the cutting element of the cutting device.

8. The system according to claim 1, wherein
a contact unit is provided, it being possible for the contact unit to be brought between an active position and a passive position, the contact unit, moving the flattened film tube into a position such that reliable movement of the separating device at least into the film tube or out of the film tube is made possible.

9. The system according to a claim 8, wherein
at least the contact unit can be transferred into a passive position in which the contact unit is spaced apart from the film tube, or
the contact unit can be brought or moved into a respective position by means of a control, the contact unit, or
the contact unit is arranged movably on a frame in such a way that the contact unit is oriented perpendicularly to the transport direction of the film tube and parallel to the orientation of the film tube.

10. The system according to claim 8, wherein
the cutting device is configured to effect two severing cuts on the film tube, wherein
the opening device has two opening elements, each opening element being insertable into a respective severing cut, and
the contact unit has two contact elements which are movable in such a way that, in the active position of the contact unit, the contact elements act on the flattened film tube, which has two opposite folding lines, and the first contact element is located between the first folding line and the first severing cut and the second contact element is located between the second folding line and the second severing cut.

11. A blown film line for the production and supply of several film webs made of plastic with:
a blow head from which a film tube can be extruded wherein the film tube can be conveyed along a transport direction;
a flattening device which is arranged downstream of the blow head and by means of which the film tube can be flattened as a double-layer plastic film;
a separating device which is configured in such a way that the flattened film tube can be separated into two separate film webs;
a system, for improved introduction of the separating device into the flattened film tube, comprising:
a cutting device for cutting through only a first tube side of the film tube, wherein the cutting device has at least one cutting element for effecting a severing cut on the film tube; and
an opening device arranged downstream of the cutting device and upstream of the separating device in a transport direction of the film tube for opening the flattened film tube along the severing cut to facilitate inserting the separating device into the flattened film tube, wherein the opening device includes at least one opening element configured to move from a position outside the flattened film tube to pass through the severing cut;
a control unit for causing the film tube to move along the transport direction; and
two winding points, wherein a film web can be fed to each winding point.

12. The blown film line according to claim 11, wherein
at least the cutting device is arranged in the flattening device or is arranged downstream of the flattening device, or
the cutting device has a control for bringing the cutting device from an activation state into a deactivation state and vice versa, in which case, in the activation state, only a first tube side of the film tube is cut through by the cutting device and, in the deactivation state, the cutting device is at a distance from the film tube.

13. The blown film line according to claim 12, wherein
at least the opening device has a control in order to bring the opening device from an active position into a passive position and vice versa, it being possible, in the active position, to bring about an opening action on the flattened film tube and, in the passive position, the opening device being spaced apart from the film tube, or
the separating device has a control for moving the separating device into the film tube which has been at least partially opened by the opening device.

14. The blown film line according to claim 11, wherein
the control unit is provided for coordinating the cutting device and the opening device.

15. The blown film line according to claim 11, wherein
at least the control unit has an activation module for actuating the cutting device in order to carry out, the cutting of the first tube side during an activation of the blown film line, or
the control unit has a winding module for detecting a winding change at least one of the winding points and for carrying out, the severing of the first tube side when the winding change is detected, or
the control unit has a record module for producing a winding record, by means of which a position of severance of the first tube side for at least one film web can be assigned.

16. The blown film line according to claim 11, wherein
an additional separating unit is arranged upstream of the winding points in the transport direction of the film tube, which additional separating unit has a further opening device for at least detaching the first tube side from a second tube side or at least one transverse separating means for separating a head region of the flattened film tube.

17. The blown film line according to claim 13, wherein
a sensor unit checks the moving film tube along the transport direction and is in communication with at least the control unit or with the control of the cutting device or with the control of the opening device or with the control of the separating device.

18. The blown film line according to claim 11, wherein
the separating device has separating elements for cutting through the flattened film tube at two positions.

19. The blown film line according to claim 18, wherein
the separating device has at least one guiding element for guiding a severed section of the first tube side to at least one of the separating elements.

20. The blown film line according to claim 18, wherein
at least the separating elements can be moved perpendicularly to the transport direction of the flattened tube film parallel to the flattened tube film level or the opening elements can be moved obliquely to the tube film level.

21. The blown film line according to claim 11, wherein
a contact unit is provided which can be brought or moved between an active position and a passive position, wherein in the active position the contact unit contacts the flattened film tube in such a way that a reliable movement of the separating device at least into the film tube or out of the film tube is made possible.

22. The blown film line according to claim 21, wherein
the separating device is arranged downstream of the contact unit and the opening device in the transport direction of the film tube.

23. The blown film line according to claim 12, wherein
in the activation state of the cutting device, the flattened film tube has at least one severing cut on the first tube side.

24. The blown film line according to claim 11, wherein
the system can be operated in a retraction process and in an extension process, it being possible, in the retraction process, for the separating device to be transferred automatically from a parking position, in which the separating device does not effect severing of the film tube, into an operating position, in which the separating device effects severing of the film tube at a folding line or folding lines.

25. The blown film line according to claim 11, wherein
a central region of the film tube and two side regions of the film tube are formed between two severing cuts, the side region being bounded by a folding line of the film tube and a facing severing cut.

26. The blown film line according to claim 24, wherein
at least the separating device can be moved into a central position for the retraction process and the extension process, in which the separating device is located at least partially in the central region within the film tube, the opening device, or for the retraction process and for the extension process, the contact unit acts on the side region of the film tube in order to ensure reliable movement of the separating device.

27. The blown film line according to claim 24, wherein
an additional cutting device is provided which can be brought into an operating mode and a sleep mode, is positioned at a distance from the film tube in the sleep mode and makes an additional cut through both tube sides of the film tube in the operating mode.

28. The blown film line according to claim 27, wherein
a frame is provided, on which the separating device and the opening device are arranged, the separating device being arranged downstream of the opening device in the transport direction of the film tube or a detection means is provided which detects at least one of the positions of the separating device, wherein, in the event of an incident in which the separating device moves from the operating position to the parking position, the additional cutting device changes from the sleep mode to the operating mode.

29. The blown film line according to claim 27, wherein
the additional cutting device is arranged downstream of the separating device in the transport direction of the film tube.

30. A method for producing and providing at least two film webs of plastic comprising the following:
extrusion of a film tube,
cutting of only a first tube side of the film tube via a cutting device for cutting through only a first tube side of the film tube, wherein the cutting device has at least one cutting element for effecting a severing cut on the film tube,
flattening the film tube to form a double-layer plastic film,
opening of the flattened film tube along the severing cut of the first tube side via an opening device arranged downstream of the cutting device and upstream of a separating device in a transport direction of the film tube, wherein the opening device includes at least one opening element configured to move from a position outside the flattened film tube to pass through the severing cut, and
separation of the flattened film tube into two separate film webs via the separating device.

31. The method according to claim 30, wherein
at least for cutting the first tube side, the cutting device is first brought into an activation state, in which the first tube side of the film tube is cut by the cutting device, and is then brought into a deactivation state, in which the cutting device is at a distance from the film tube, or
in order to open the flattened film tube, the opening device is brought into an active position, in which an opening action is effected on the flattened film tube, and is then brought into a passive position, in which the opening device is spaced apart from the film tube or a separating device with separating elements is provided for separating the flattened tube film into two separate film webs, the separating elements being movable perpendicularly to the transport direction of the flattened tube film parallel to the flattened tube film level.

32. The method according to claim 30,
wherein
at least the cutting of the first tube side and the opening of the flattened film tube are carried out at different positions along the transport direction of the film tube and are automatically coordinated, or when the film tube flattened is opened, at least one opening element is introduced into the severing cut, or
the flattened film tube is cut at two positions when the first tube side is cut, or
after extrusion, the film tube is deflected by a deflection unit for deflecting the film tube.

33. The method according to claim 30,
wherein
an adhesive property of an inner side of the film tube is locally changed to facilitate opening of the film tube flattened at the severing cut.

34. The method according to claim 30,
wherein
in order to open the flattened film tube, a second tube side, opposite the first tube side, of the film tube is stretched in such a way that a stretching force of the second tube side exceeds a retaining force between the first and second tube sides.

35. The method according to claim 30,
wherein
the severing of the first tube side is carried out during an activation of the blown film line.

36. The method according to claim 30,
wherein
winding of at least one film web onto at least one winder takes place.

37. The method according to claim 36,
wherein
a winding record, is produced, by means of which a position of severance of the first tube side for at least one film web can be assigned, or
before the winding, a further opening of the film tube is carried out by at least detaching the first tube side from a second tube side or by separating a head region of the flattened film tube.

38. The method according to claim 31,
wherein
in a retraction process, the separating device is automatically transferred from a parking position, in which the separating device does not effect severing of the film tube, into an operating position, in which the separating device effects severing of the film tube at least its folding line or folding lines.

39. The method according to claim 38,
wherein
in the retraction process the following takes place:
a) transfer of the cutting device to the activation state at the start of the introduction process, so that at least one severing cut or two severing cuts are made on the first tube side of the film tube,
b) transfer of the opening device from the passive position into the active position, and
c) transfer of the separating device from a parking position, in which the separating device does not cut through the film tube, into an operating position, in which the separating device cuts through the film tube at least its folding line or folding lines.

40. The method according to claim 39,
wherein
at least in a), a central region of the film tube and two side regions of the film tube are formed between the two severing cuts, the side region being bounded by a folding line of the film tube and the facing severing cut.

41. The method according to claim 40,
wherein
during c), the separating device is moved to a central position in which the separating device is located at least partially in the central region inside the film tube, the opening device being in the active position, wherein
in g), the separating device moves from the central position to the operating position.

42. The method according to claim 41,
wherein
in c), a contact unit moves from a passive position, into an active position, the contact unit acting on the side region of the film tube in the active position in order for the separating device to move reliably from the parking position into the central position.

43. The method according to claim 42,
wherein
after the separating device has reached the central position, the following steps are carried out:
d) transfer of the opening device from the active position to the passive position, and
e) transfer of the contact unit from the active position to the passive position.

44. The method according to claim 43,
wherein
in f), the cutting device is transferred from the activation state to the deactivation state.

45. The method according to claim 44,
wherein
g) is carried out after at least one of d), e) or f).

46. The method according to claim 45,
wherein
in an extension process, the separating device is automatically transferred from an operating position, in which the separating device effects severing of the film tube at least its folding line or folding lines, to a parking position, in which the separating device does not effect severing of the film tube.

47. The method according to claim 46,
wherein
the following takes place in the extension process:
h) transfer of the cutting device to the activation state at the start of the extension process, so that at least one severing cut or two severing cuts are made on the first tube side of the film tube,
i) transfer of the opening device from the passive position into the active position, and
j) transfer of the separating device from an operating position, in which the separating device effects a severing of the film tube at least its folding line or folding lines, into a parking position, in which no severing of the film tube is effected by the separating device.

48. The method according to claim 47,
wherein
during j), the separating device is moved to the central position in which the separating device is located at least partially in the central region within the film tube, the opening device being located in the active position, wherein
in k), the separating device moves from the central position to the parking position.

49. The method according to claim 48,
wherein
in i), a contact unit is transferred or moves from a passive position, into an active position, the contact unit acting on the side region of the film tube in the active position in order for the separating device to move reliably from the operating position into the central position and into the parking position.

50. The method according to claim 48,
wherein
while the separating device leaves the central position in the direction of the parking position, the opening device remains in the active position.

51. The method according to claim 50,
wherein
after the separating device has reached the parking position, the following takes place:
m) transfer of the opening device from the active position to the passive position, and
n) transfer of the cutting device from the activation state to the deactivation state.

52. The method according to claim 51,
wherein
a detection means is provided which, during the production of the film webs, detects a malfunction in which the separating device, moves from the operating position into the parking position, as a result of which an additional cutting device is activated in p), which additional cutting device, in an operating mode, makes an additional cut through both tube sides of the film tube, the additional cut being arranged downstream of the separating device in the transport direction of the film tube.

53. The method according to claim 52,
wherein
after p), the malfunctioning separating element is replaced by a functioning separating element and then the steps of the retraction process are carried out for the functioning separating element.

54. The method according to claim 41,
wherein
before the separating device, moves from the central position in the direction of the operating position, the cutting device moves into the deactivation state, the following steps are then carried out:
movement of the separating device, and
transfer of the additional cutting device from the operating mode to a sleep mode, in which an introduction of an additional cut is omitted.

\* \* \* \* \*